US012007714B2

(12) United States Patent
Okabe et al.

(10) Patent No.: US 12,007,714 B2
(45) **Date of Patent: *Jun. 11, 2024**

(54) IMAGE FORMING APPARATUS INCLUDING COUPLING MEMBER SELECTIVELY COUPLED TO PHOTOSENSITIVE DRUM

(71) Applicant: BROTHER KOGYO KABUSHIKI KAISHA, Nagoya (JP)

(72) Inventors: Yasushi Okabe, Nagoya (JP); Junichi Hashimoto, Toyohashi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/752,219

(22) Filed: May 24, 2022

(65) Prior Publication Data

US 2022/0283539 A1 Sep. 8, 2022

Related U.S. Application Data

(60) Continuation of application No. 17/089,879, filed on Nov. 5, 2020, now Pat. No. 11,353,823, which is a (Continued)

(30) Foreign Application Priority Data

Oct. 31, 2008 (JP) ................................ 2008-281991
Oct. 31, 2008 (JP) ................................ 2008-281992
Oct. 31, 2008 (JP) ................................ 2008-281993

(51) Int. Cl.

*G03G 21/18* (2006.01)
*G03G 15/00* (2006.01)

(Continued)

(52) U.S. Cl.

CPC ..... *G03G 21/1867* (2013.01); *G03G 15/0194* (2013.01); *G03G 15/5008* (2013.01);

(Continued)

(58) Field of Classification Search

CPC ........... G03G 15/0194; G03G 15/5008; G03G 15/757; G03G 21/1671; G03G 21/1857; G03G 21/186; G03G 21/1871

See application file for complete search history.

(56) References Cited

U.S. PATENT DOCUMENTS 3,638,112 A 1/1972 Lasater et al.
5,765,082 A 6/1998 Numazu et al.

(Continued)

FOREIGN PATENT DOCUMENTS

EP 1058161 A1 12/2000
EP 1816527 A2 8/2007

(Continued)

OTHER PUBLICATIONS

Office Action received in corresponding Chinese Patent Application 200910205932.9 dated Jun. 1, 2012.

(Continued)

*Primary Examiner* — Benjamin R Schmitt
(74) *Attorney, Agent, or Firm* — Merchant & Gould P.C.

(57) ABSTRACT

In an image forming apparatus, a process frame is movable into and out of a main casing in a first direction. The process frame includes a first wall and a second wall spaced apart from the first wall in a second direction. A first cartridge is detachably mountable to the process frame in a third direction crossing the second direction. A first electrode protrudes from an outer surface of the first cartridge outwardly in the second direction. In a state where the first cartridge is mounted to the process frame, the first cartridge is positioned between the first wall and second wall of the process (Continued)

frame in the second direction and a portion of the first wall aligns with the first electrode in the third direction such that the portion of the first wall is overlapped with the first electrode as viewed in the third direction.

12 Claims, 22 Drawing Sheets

Related U.S. Application Data continuation of application No. 16/573,094, filed on Sep. 17, 2019, now Pat. No. 10,831,152, which is a continuation of application No. 16/130,438, filed on Sep. 13, 2018, now Pat. No. 10,444,700, which is a continuation of application No. 15/275,905, filed on Sep. 26, 2016, now Pat. No. 10,082,766, which is a continuation of application No. 14/948,591, filed on Nov. 23, 2015, now Pat. No. 9,477,202, which is a continuation of application No. 14/053,143, filed on Oct. 14, 2013, now Pat. No. 9,201,370, which is a division of application No. 12/606,660, filed on Oct. 27, 2009, now Pat. No. 8,577,255.

(51) Int. Cl.
*G03G 15/01* (2006.01)
*G03G 21/16* (2006.01)

(52) U.S. Cl.
CPC ....... *G03G 15/757* (2013.01); *G03G 21/1647* (2013.01); *G03G 21/1652* (2013.01); *G03G 21/1825* (2013.01); *G03G 21/1842* (2013.01); *G03G 21/1853* (2013.01); *G03G 15/0178* (2013.01); *G03G 2221/166* (2013.01); *G03G 2221/1684* (2013.01); *G03G 2221/1869* (2013.01)

(56) References Cited

U.S. PATENT DOCUMENTS 6,708,011 B2 3/2004 Nomura et al.
6,721,521 B2 4/2004 Kataoka et al.
7,706,716 B2 4/2010 Tada et al.
7,715,752 B2 5/2010 Sakurai et al.
7,826,773 B2 11/2010 Kawamura
7,899,360 B2 3/2011 Kondo et al.
7,937,020 B2 5/2011 Sakurai et al.
7,957,670 B2 6/2011 Kondo et al.
8,056,894 B2 11/2011 Ichikawa
8,126,366 B2 2/2012 Hattori
9,116,502 B2 8/2015 Hayakawa et al.
9,367,026 B2 6/2016 Nakashima
2001/0019418 A1 9/2001 Kataoka et al.
2003/0161656 A1 8/2003 Miura et al.
2005/0214023 A1 9/2005 Foster et al.
2006/0140674 A1 6/2006 Sato
2006/0146371 A1 7/2006 Hoashi et al.
2007/0110473 A1 5/2007 Kondo et al.
2007/0160384 A1 7/2007 Sakurai et al.
2007/0160385 A1 7/2007 Noguchi et al.
2007/0177899 A1 8/2007 Kawamura
2007/0183814 A1 8/2007 Kamimura
2007/0280730 A1 12/2007 Okabe et al.
2007/0280733 A1 12/2007 Shiraki et al.
2007/0286632 A1 12/2007 Okabe
2008/0002341 A1 1/2008 Tomatsu
2008/0003015 A1 1/2008 Tomatsu
2008/0075502 A1 3/2008 Tada et al.
2008/0159772 A1 7/2008 Koishi et al.
2008/0159774 A1 7/2008 Tanabe et al.
2008/0159781 A1 7/2008 Noguchi et al.
2008/0310881 A1* 12/2008 Sato .................. G03G 15/0813 399/113
2009/0041498 A1 2/2009 Numagami et al.
2009/0047040 A1 2/2009 Nieda
2009/0123181 A1 5/2009 Ito et al.
2009/0169247 A1 7/2009 Hattori
2009/0202272 A1 8/2009 Nakashima
2009/0245869 A1 10/2009 Nieda
2010/0111562 A1 5/2010 Okabe et al.
2010/0209139 A1 8/2010 Sakurai et al.
2011/0013935 A1 1/2011 Kondo et al.
2011/0102983 A1 5/2011 Souda et al.
2011/0164897 A1 7/2011 Kikuchi
2012/0114376 A1 5/2012 Kawamura
2012/0195633 A1 8/2012 Okabe
2012/0251172 A1 10/2012 Hashimoto et al.
2012/0275822 A1 11/2012 Kawamura
2014/0010569 A1 1/2014 Souda
2014/0086622 A1 3/2014 Nakashima
2014/0093279 A1 4/2014 Hayakawa et al.
2014/0241749 A1* 8/2014 Okabe .................... G03G 15/80 399/90
2014/0294437 A1 10/2014 Okabe
2014/0376944 A1 12/2014 Souda et al.
2014/0376945 A1 12/2014 Souda et al.
2014/0376946 A1 12/2014 Souda et al.
2014/0376947 A1 12/2014 Nishimura
2014/0376957 A1 12/2014 Souda et al.
2014/0376958 A1 12/2014 Souda et al.
2015/0139679 A1 5/2015 Souda
2015/0139687 A1 5/2015 Souda
2015/0177677 A1 6/2015 Souda
2015/0177678 A1 6/2015 Souda
2015/0177679 A1 6/2015 Souda
2015/0177680 A1 6/2015 Souda et al.
2015/0261174 A1 9/2015 Souda
2016/0009510 A1 1/2016 Kawai

FOREIGN PATENT DOCUMENTS

JP 08-305184 A 11/1996
JP 09-281770 A 10/1997
JP 11-084799 A 3/1999
JP 2000-181329 A 6/2000
JP 2001-249517 A 9/2001
JP 2003-015378 A 1/2003
JP 2003-316233 A 11/2003
JP 2006-184901 A 7/2006
JP 2007-140041 A 6/2007
JP 2007-213023 A 8/2007
JP 2007-213033 A 8/2007
JP 2008-065122 A 3/2008
JP 2009-162915 A 7/2009
JP 2010-052423 A 3/2010
JP 2010-107890 A 5/2010
JP 2011-065030 A 3/2011
JP 2011-215406 A 10/2011
JP 4867955 B2 2/2012

OTHER PUBLICATIONS

Office Action received in corresponding Chinese Patent Application 200910205932.9 dated May 25, 2011.
Extended European Search Report for application No. 09174172.8 dated Nov. 24, 2010.
Office Action received in corresponding Japanese Patent Application No. 2008-281992 dated Sep. 7, 2010.
Office Action received in corresponding Japanese Patent Application No. 2008-281993 dated Sep. 7, 2010.
Office Action received in corresponding Japanese Patent Application 2008-281991 dated Aug. 17, 2010.
Copending U.S. Appl. No. 14/032,988, filed Sep. 20, 2013.
Copending U.S. Appl. No. 14/032,923, filed Sep. 20, 2013.
Non-final Office Action issued in U.S. Appl. No. 14/053,095 dated Jan. 27, 2014.
Final Office Action received in corresponding U.S. Appl. No. 14/053,095 dated Jun. 16, 2014.

(56) References Cited

OTHER PUBLICATIONS

Dec. 29, 2014—U.S. Non-final Office Action—U.S. Appl. No. 14/032,988.
Feb. 10, 2015—U.S. Notice of Allowance—U.S. Appl. No. 14/053,095.
Apr. 14, 2015—U.S. Non-Final Office Action—U.S. Appl. No. 14/032,923.
May 8, 2015—U.S. Notice of Allowance—U.S. Appl. No. 14/032,988.
Oct. 9, 2015—U.S. Final Office Action—U.S. Appl. No. 14/032,923.
Feb. 2, 2016—U.S. Notice of Allowance—U.S. Appl. No. 14/032,923.
Apr. 6, 2016—(CN) Office Action—App 201310428796.6—Eng Tran.

* cited by examiner

IMAGE FORMING APPARATUS INCLUDING COUPLING MEMBER SELECTIVELY COUPLED TO PHOTOSENSITIVE DRUM

CROSS REFERENCE TO RELATED APPLICATION

This application is a continuation of U.S. application Ser. No. 17/089,879, filed Nov. 5, 2020, issued as U.S. Pat. No. 11,353,823, which is a continuation of U.S. application Ser. No. 16/573,094, filed Sep. 17, 2019, issued as U.S. Pat. No. 10,831,152 on Nov. 10, 2020, which is a continuation of U.S. application Ser. No. 16/130,438 filed Sep. 13, 2018, issued as U.S. Pat. No. 10,444,700 on Oct. 15, 2019, which is a continuation of U.S. application Ser. No. 15/275,905 filed Sep. 26, 2016, issued as U.S. Pat. No. 10,082,766 on Sep. 25, 2018, which is a continuation of U.S. application Ser. No. 14/948,591 filed Nov. 23, 2015, issued as U.S. Pat. No. 9,477,202 on Oct. 25, 2016, which is a continuation of U.S. application Ser. No. 14/053,143 filed Oct. 14, 2013, issued as U.S. Pat. No. 9,201,370 on Dec. 1, 2015, which is a divisional of U.S. application Ser. No. 12/606,660, filed Oct. 27, 2009, issued as U.S. Pat. No. 8,577,255 on Nov. 5, 2013, which claims priority from Japanese Patent Application No. 2008-281992 filed Oct. 31, 2008, Japanese Patent Application No. 2008-281993 filed Oct. 31, 2008, and Japanese Patent Application No. 2008-281991 filed Oct. 31, 2008. The entire contents of the above noted applications are incorporated herein by reference.

TECHNICAL FIELD

The present invention relates to an image forming apparatus.

BACKGROUND

One image forming apparatus known in the art is an electrophotographic color printer having a conveying belt disposed in confrontation with four photosensitive members corresponding to the four colors black, yellow, magenta, and cyan. However, the photosensitive members in this image-forming device are constantly in contact with the conveying belt. Therefore, even during operations to form images using only black, for example, the photosensitive members corresponding to the remaining colors yellow, magenta, and cyan remain in contact with the conveying belt and, consequently, wear more quickly.

Therefore, color image recorders have been proposed as image-forming devices capable of preventing such unnecessary wear and deterioration of the photosensitive members. For example, a color image recorder configures yellow, magenta, and cyan image-forming parts as a single color image-forming unit, and a black image-forming part as a single image-forming unit. With this image recorder, the color image-forming unit is separated from the conveying belt when forming black images.

However, in the color image recorder described above, the black image-forming part and color image-forming unit are operated independently. This configuration can potentially lead to fluctuations in the gap between the black image-forming part and the color image-forming unit during operations, making it difficult to maintain a uniform interval between neighboring photosensitive members. Maintaining this uniform interval between neighboring photosensitive members is extremely important for preventing color registration problems in color printers.

SUMMARY

In view of the foregoing, it is an object of the present invention to provide an image-forming apparatus capable of separating photosensitive members from an endless belt while preserving the interval between adjacent photosensitive members.

In order to attain the above and other objects, the invention provides an image forming apparatus including a main body, an endless belt, a plurality of photosensitive drums, a mode setting unit, a contacting/separating mechanism, a transmitting mechanism, and a plurality of coupling members. The plurality of photosensitive drums is disposed in confrontation with the endless belt and is arranged in a first direction. Each photosensitive drum has an axis extending in a second direction perpendicular to the first direction. The mode setting unit sets the image forming apparatus to one of a monochrome printing mode and a color printing mode. The contacting/separating mechanism controls at least one of the plurality of photosensitive drums to contact or separate from the endless in accordance with the set mode. The transmitting mechanism selectively transmits drive power to the plurality of photosensitive drums. The plurality of coupling members correspond respectively to the plurality of photosensitive drums. Each coupling member is selectively coupled to the corresponding photosensitive drum and has a coupling axis extending in the second direction of the corresponding photosensitive drum. Each coupling member is uncoupled from the corresponding photosensitive drum when the contacting/separating mechanism controls the corresponding photosensitive drum to separate from the endless belt.

BRIEF DESCRIPTION OF THE DRAWINGS

The particular features and advantages of the invention as well as other objects will become apparent from the following description taken in connection with the accompanying drawings, in which:

FIG. 15(*b*) is a side view illustrating the drum unit and the main body in the state shown in FIG. 12;

FIG. 19(*b*) is a side view illustrating the drum unit and the main body when the image forming apparatus is set to the monochrome mode;

DETAILED DESCRIPTION

Figure 1:
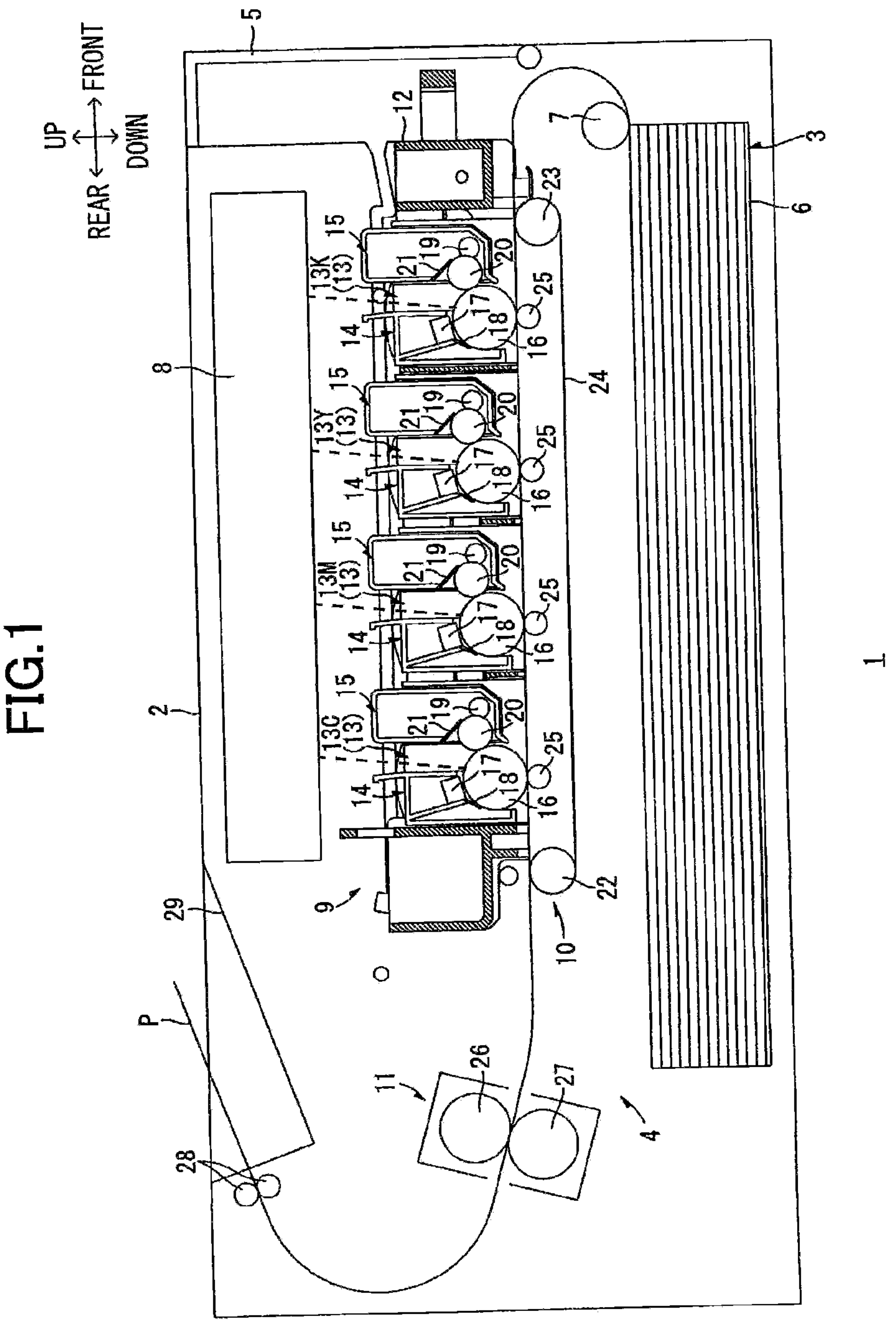
FIG. 1 is a side cross-sectional view of an image forming apparatus according to a preferred embodiment of the present invention.

As shown in FIG. 1, a printer 1 serving as a preferred embodiment of the image-forming apparatus according to the present invention is a horizontal tandem-type color laser printer that includes a main casing 2 as the main body of the printer, and, within the main casing 2, a feeding unit 3 for supplying sheets of a paper P to be printed, and an image-forming unit 4 for forming images on the sheets of paper P supplied from the feeding unit 3. The terms "up", "down", "upper", "lower", "above", "below", "beneath", "right", "left", "front", "rear" and the like will be used throughout the description assuming that the printer 1 is disposed in an orientation in which it is intended to be used. In use, the printer 1 is disposed as shown in FIG. 1.

The main casing 2 has a box shape that is substantially rectangular in a side view. The image-forming unit 4 is accommodated in the main casing 2. A front cover 5 is provided on one side wall of the main casing 2 for exposing the inside of the main casing 2 in order to mount or remove a process frame 12 described later.

In the following description, the side of the color laser printer 1 on which the front cover 5 is provided (right side in FIG. 1) will be referred to as the front side, and the opposite side (left side in FIG. 1) as the rear side. The left and right sides of the color laser printer 1 will be based on a user's perspective when viewing the color laser printer 1 from the front. Hence, the near side of the color laser printer 1 in FIG. 1 is the left side, and the far side is the right side.

The feeding unit 3 includes a paper tray 6 for accommodating sheets of the paper P. The paper tray 6 is detachably mounted in the bottom section of the main casing 2. A feeding roller 7 is disposed above the front end of the paper tray 6 for feeding sheets of paper P from the paper tray 6 to the image-forming unit 4 along a U-shaped feeding path (not shown).

The feeding roller 7 rotates to feed sheets of paper P accommodated in the paper tray 6 onto the feeding path one sheet at a time. The sheets of paper P are subsequently conveyed from the feeding path to the image-forming unit 4 so as to pass between four photosensitive drums 16 and a conveying belt 24 described later.

The image-forming unit 4 includes a scanning unit 8, a process unit 9, a transfer unit 10, and a fixing unit 11. The scanning unit 8 is disposed above the main casing 2. The scanning unit 8 irradiates laser beams toward the four photosensitive drums 16 based on image data to expose the surfaces of the corresponding photosensitive drums 16.

The process unit 9 is disposed below the scanning unit 8 and above the feeding unit 3. The process unit 9 is detachably mounted on the main casing 2. The process unit 9 includes the single process frame 12, and four process cartridges 13 corresponding to the four printing colors.

The process frame 12 is slidably supported in the main casing 2 and can be slid into or out of the main casing 2 in the front-to-rear direction. The process cartridges 13 are mounted in the process frame 12 in a juxtaposed arrangement in the front-to-rear direction (mounting direction). More specifically, the process cartridges 13 support a black process cartridge 13K, a yellow process cartridge 13Y, a magenta process cartridge 13M, and a cyan process cartridge 13C arranged from the front side to the rear side in the sequence given. Each process cartridge 13 is provided with a drum unit 14, and a developer cartridge 15.

Each drum unit 14 includes a photosensitive drum 16, a Scorotron charger 17, and a cleaning blade 18. The photosensitive drum 16 is oriented with its axis along the left-to-right direction. Specifically, the photosensitive drum 16 of the black process cartridges 13K has an axis extending in a first axial direction parallel to the left-to-right direction. Each of photosensitive drums 16 of the yellow process cartridge 13Y, the magenta process cartridge 13M, and the cyan process cartridge 13C has an axis extending in a second axial direction parallel to the first axial direction. The black photosensitive drum 16 is disposed at a position nearest to one end of the process unit 9 that is upstream in the mounting direction.

The Scorotron charger 17 is disposed diagonally above and rearward of the photosensitive drum 16 and confronts but does not contact the photosensitive drum 16. The cleaning blade 18 is disposed to the rear of the photosensitive drum 16 and confronts and contacts the photosensitive drum 16.

The developer cartridge 15 is disposed on the front side of the corresponding drum unit 14 and includes a supply roller 19, a developing roller 20, and a thickness-regulating blade 21.

The developing roller 20 is disposed so as to contact the front side of the photosensitive drum 16. The supply roller 19 is disposed on the front side of the developing roller 20. The thickness-regulating blade 21 is disposed above the developing roller 20. The space formed in the developer cartridge 15 above these components serves to accommodate toner in the corresponding color.

With the process cartridge 13, toner accommodated in the developer cartridge 15 is supplied onto the supply roller 19, which in turn supplies toner to the developing roller 20. At the same time, the toner is positively tribocharged between the supply roller 19 and developing roller 20.

As the developing roller 20 rotates, the thickness-regulating blade 21 regulates the toner carried on the surface of the developing roller 20 to a prescribed thickness so that the developing roller 20 carries a uniform thin layer of toner.

In the meantime, the Scorotron charger 17 applies a uniform charge of positive polarity to the surface of the photosensitive drum 16 while the photosensitive drum 16 rotates. Subsequently, the scanning unit 8 irradiates a laser beam (indicated by dash-line in FIG. 1) through the gap formed between the photosensitive drum unit 14 and developer cartridge 15 to expose the surface of the photosensitive drum 16 in a high-speed scan. In this way, the scanning unit 8 forms an electrostatic latent image on the surface of the photosensitive drum 16 corresponding to an image to be formed on the paper P.

As the photosensitive drum 16 continues to rotate, the positively charged toner carried on the surface of the developing roller 20 is supplied to the electrostatic latent image formed on the surface of the photosensitive drum 16, thereby developing the electrostatic latent image into a visible toner image through reverse development.

The transfer unit 10 is disposed in the main casing 2 above the feeding unit 3 and below the process unit 9 and extends in the front-to-rear direction. The transfer unit 10 includes a drive roller 22, a follow roller 23, the conveying belt 24, and four transfer rollers 25.

The drive roller 22 and follow roller 23 are parallel to each other and separated in the front-to-rear direction. The endless conveying belt 24 and is mounted around the drive roller 22 and follow roller 23. The transfer rollers 25 are disposed inside the conveying belt 24 at positions opposing the photosensitive drums 16 with the conveying belt 24 interposed therebetween. Positions between each photosensitive drum 16 and the corresponding transfer roller 25 are referred to as transfer positions.

The upper portion of the conveying belt 24 moves rearward for conveying a sheet of paper P supplied from the feeding unit 3 sequentially through each transfer position between the photosensitive drums 16 and transfer rollers 25. As the sheet is conveyed on the conveying belt 24, toner images in each color carried on the respective photosensitive drums 16 are sequentially transferred onto the sheet to form a color image.

The fixing unit 11 is disposed to the rear of the transfer unit 10 and includes a heating roller 26, and a pressure roller 27 in confrontation with the heating roller 26. After a color image has been transferred onto the sheet of paper P in the transfer unit 10, the image is fixed to the sheet by a combination of heat and pressure as the sheet passes between the heating roller 26 and pressure roller 27 in the fixing unit 11.

After the toner image has been fixed to the paper P, the sheet is conveyed along a U-shaped discharge path (not shown) toward a pair of discharge rollers 28 disposed at the downstream end of the path. The discharge rollers 28 discharge the sheet onto a discharge tray 29 formed on the top surface of the main casing 2.

Figure 2:
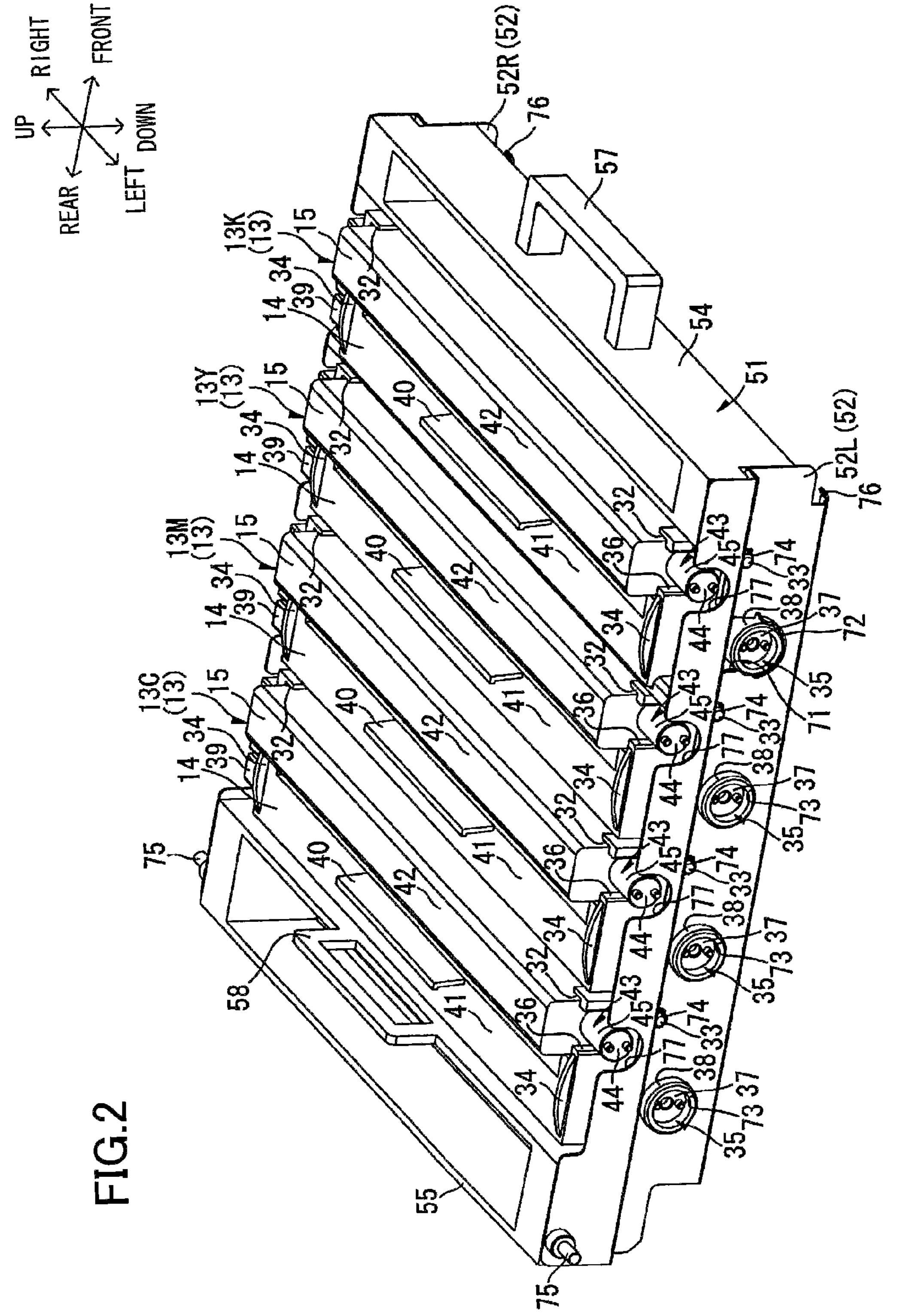
FIG. 2 is a perspective view of a drum unit provided in the image forming apparatus.
Figure 3:
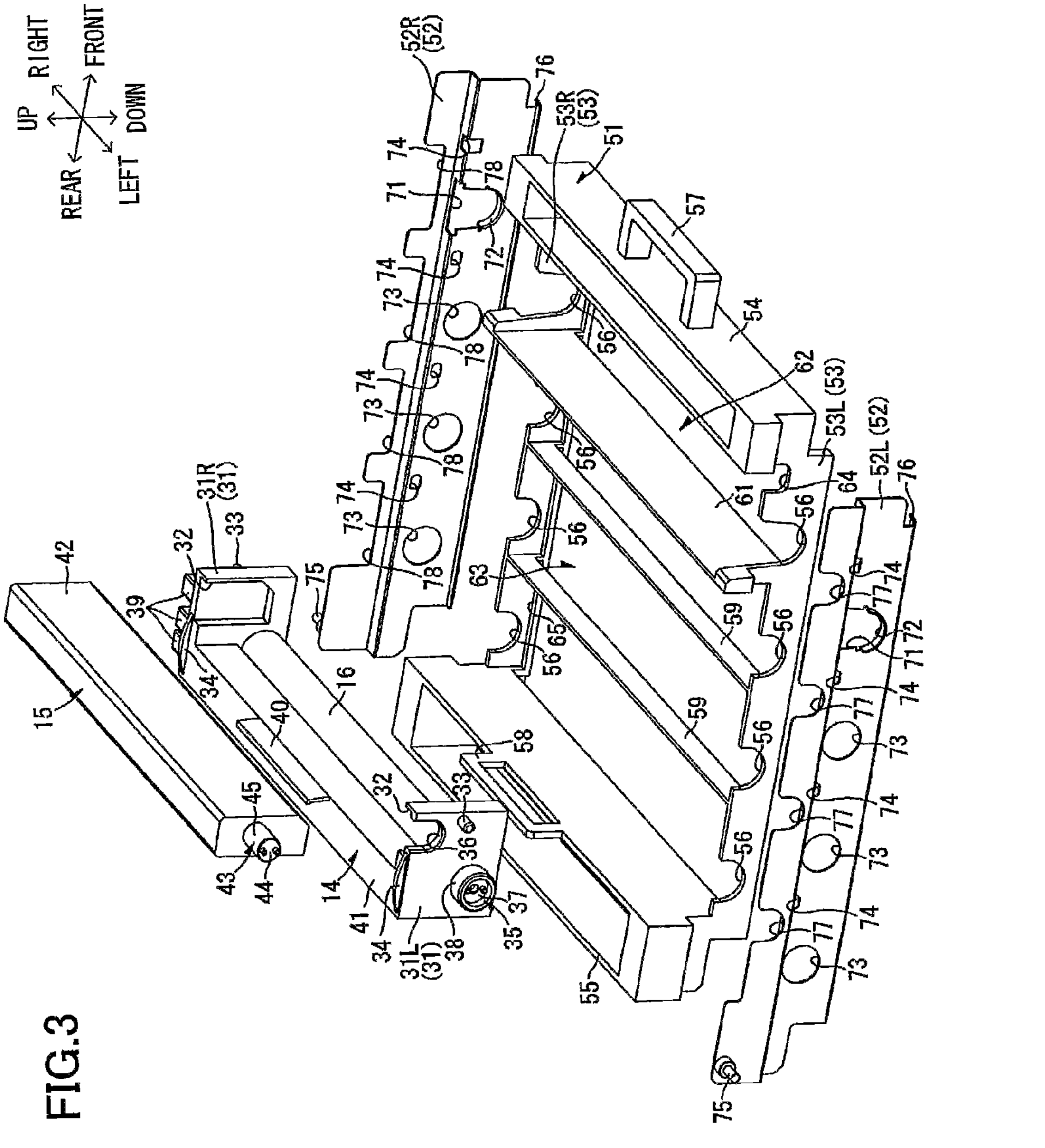
FIG. 3 is an exploded perspective view of the drum unit shown in FIG. 2.

As shown in FIGS. 2 and 3, each process cartridge 13 is provided with a pair of left and right side walls 31 disposed substantially parallel to each other but separated in the left-to-right direction, the photosensitive drum unit 14 spanning between the side walls 31, and the developer cartridge 15 detachably supported in the side walls 31.

Each of the side walls 31 is a flat plate that is rectangular in a side view and has a thickness in the left-to-right direction. Hereinafter, when distinguishing between the side walls 31 disposed on the left and right sides, the side wall 31 on the left side will be referred to as the left side wall 31L, while the side wall 31 on the right side will be referred to as the right side wall 31R. Developer guide grooves 32 are formed in the inner surfaces of both side walls 31 for receiving both left and right ends of the developer cartridges 15. Further, stoppers 33 are provided on the outer surfaces of both side walls 31, while protrusions 34 are formed on the top edges of the side walls 31.

The developer guide grooves 32 are formed as cutouts in the front portions of both side walls 31 and are substantially rectangular in shape in a side view, extending from the top edges of the side walls 31 to a point near the bottom edges.

The stoppers 33 are cylindrical ribs that protrude outward from the outer surfaces of both side walls 31 in the respective left and right directions. The stoppers 33 are positioned near the front edges of the side walls 31 and in substantially the vertical center thereof.

The protrusions 34 are plates extending upward from the top edges of the side walls 31. Each protrusion 34 is arc-shaped in a side view, sharing a central axis with the respective photosensitive drum 16. Laterally, the protrusions 34 extend from the rear edges of the side walls 31 to the centers thereof.

In addition, a drum coupling 35 is provided near the lower rear corner of the left side wall 31L for inputting a drive force from the main casing 2 side. A developer coupling support groove 36 is formed in the top edge of the left side wall 31L near the front side thereof for receiving a developer coupling (described later).

The drum coupling 35 includes a drum coupling cover 38, and a female drum coupling member 37 rotatably supported by the drum coupling cover 38. The drum coupling cover 38 is cylindrically shaped and protrudes leftward from the left surface of the left side wall 31L. The female drum coupling member 37 is coupled to the left end of the photosensitive drum 16 so as to be unable to rotate relative to the photosensitive drum 16.

The developer coupling support groove 36 is a cutout formed in the top edge of the left side wall 31L at a position overlapping the developer guide grooves 32 when projected from left to right. The developer coupling support groove 36 has a U-shape in a side view with an open top.

A drum support member (not shown) is also provided on the right side wall 31R for supporting the right end of the photosensitive drum 16 so as to be incapable of rotating relative to the photosensitive drum 16. The drum support member has the same cylindrical shape as the drum coupling cover 38 and protrudes rightward from the right surface of the right side wall 31R.

A plurality of electrodes 39 is provided on the right side wall 31R. Body-side electrodes (not shown) provided in the main casing 2 are connected to the electrodes 39 for supplying power to the process cartridge 13.

Each of the drum units 14 includes the photosensitive drum 16, Scorotron charger 17, cleaning blade 18, and a drum partition 41 accommodating these components. The photosensitive drum 16 is rotatably supported between the corresponding side walls 31. The Scorotron charger 17 spans between the side walls 31 at a position diagonally above and rearward of the corresponding photosensitive drum 16 (see FIG. 1). The cleaning blade 18 also spans between the corresponding side walls 31 on the rear side of the photosensitive drum 16 (see FIG. 1).

Each drum partition 41 has a cylindrical shape that is open on the bottom. The drum partition 41 spans between the corresponding side walls 31 and is formed integrally therewith. The side walls 31 and the drum partition 41 for covering the photosensitive drum 16. A grip part 40 is integrally formed on the top surface of each drum unit 14.

The developer cartridge 15 includes the supply roller 19, the developing roller 20, and a developer frame 42 for accommodating these components. The supply roller 19 and developing roller 20 are disposed adjacent to each other in the bottom end of the developer frame 42, with the supply roller 19 on the front side and the developing roller 20 on the rear side, and are rotatably supported in the developer frame 42 (see FIG. 1).

The developer frame 42 extends in the left-to-right direction and is box-shaped, with an opening formed in the lower rear side at a position confronting the developing roller 20.

A developer coupling 43 is provided on the left end of the developer frame 42 in the vertical center thereof for inputting a drive force from the main casing 2 side to the supply roller 19 and developing roller 20.

The developer coupling 43 includes a developer coupling cover 45, and a female developer coupling member 44 rotatably supported by the developer coupling cover 45. The developer coupling cover 45 has a cylindrical shape and protrudes leftward from the left endface of the developer frame 42. The female developer coupling member 44 is coupled with a gear part (not shown) for driving the supply roller 19 and developing roller 20.

In order to mount the developer cartridge 15 in the photosensitive drum unit 14, the operator grips the top of the developer frame 42 so that the developing roller 20 is positioned on the bottom of the developer cartridge 15 and the developer coupling 43 is positioned on the left. The operator aligns the developer cartridge 15 above the photosensitive drum unit 14 for fitting the left and right ends of the developer cartridge 15 into the developer guide grooves 32 of the side walls 31 and for fitting the developer coupling 43 into the developer coupling support groove 36, and inserts the developer cartridge 15 downward into the photosensitive drum unit 14.

At this time, the left and right ends of the developer cartridge 15 are fitted into the developer guide grooves 32 and guided downward therein. The lower edges of the left and right ends of the developer cartridge 15 contact the lower edges of the developer guide grooves 32 while the developer coupling 43 is fitted into the developer coupling support groove 36. This completes mounting of the developer cartridge 15 in the photosensitive drum unit 14.

Next, details of the process frame 12 will be described. The process frame 12 includes a cartridge support frame 51 for supporting all four of the process cartridges 13 from the bottom thereof, and a pair of side plates 52 provided on the left and right sides of the cartridge support frame 51.

The cartridge support frame 51 is a framework formed to encompass the peripheries of the four process cartridges 13. The cartridge support frame 51 is integrally provided with a pair of left and right frame side walls 53, a front beam 54, and a rear beam 55. The cartridge support frame 51 also has a black partitioning plate 61 spanning between the frame side walls 53 at a position between the front beam 54 and rear beam 55.

The black partitioning plate 61 serves to partition the space between the front beam 54 and the rear beam 55 in the cartridge support frame 51 into a black mounting portion 62 for the black process cartridge 13K, and a color mounting portion 63 to the rear of the black mounting portion 62 for the three remaining process cartridges 13. In other words, the black mounting portion 62 is defined by the frame side walls 53, the front beam 54, and the black partitioning plate 61, while the color mounting portion 63 is defined by the frame side walls 53, the rear beam 55, and the black partitioning plate 61.

As shown in FIG. 3, two partitioning plates 59 span in the left-to-right direction between the frame side walls 53 at positions over the color mounting portion 63. Each partitioning plates 59 also extends vertically with the left and right ends thereof connected to the corresponding frame side walls 53 at positions between neighboring drum support grooves 56 (described later). Hence, the space encompassed by the front beam 54, rear beam 55, and the pair of left and right frame side walls 53 is divided into four substantially equal intervals in the front-to-rear direction by the black partitioning plate 61 and the partitioning plates 59.

The side walls 31, developer guide grooves 32, and the black partitioning plate 61 all extend farther upward than the partitioning plates 59. The frame side walls 53 are arranged parallel to each other and are separated in the left-to-right direction. Hereinafter, the frame side wall 53 on the left side will be referred to as the left frame side wall 53L, and the frame side wall 53 on the right side the right frame side wall 53R when it is necessary to distinguish between the two.

Four drum support grooves 56 are formed at substantially regular intervals in the front-to-rear direction in each of the frame side walls 53. The drum support grooves 56 are substantially U-shaped in a side view so as to be open on the top and are formed at positions corresponding to the drum couplings 35 of the process cartridges 13 or drum support members (not shown). The drum support grooves 56 formed in the left frame side wall 53L are formed in a shape for receiving the drum coupling covers 38, while the drum support grooves 56 in the right frame side wall 53R are formed in a shape for receiving the drum support members.

A stopper support groove 64 is formed in each of the frame side walls 53 in the portion of the frame side walls 53 adjacent to the black mounting portion 62. The stopper support grooves 64 are formed in front of the corresponding drum support grooves 56 at positions aligned with the stoppers 33 of the black process cartridge 13K. The stopper support grooves 64 are substantially U-shaped in a side view with an open top for receiving the stoppers 33.

A cartridge support rail 65 is formed across the entire front-to-rear length on the lower edge of each frame side wall 53 and protrudes inward therefrom. The cartridge support rails 65 are formed at positions for receiving contact from the side walls 31 of the process cartridges 13 when the process cartridges 13 are mounted in the process frame 12.

The front beam 54 spans between the front ends of the frame side walls 53 in the left-to-right direction and has a substantially U-shaped cross section. A first frame handle 57 is integrally formed on the front surface of the front beam 54.

Similarly, the rear beam 55 spans between the rear ends of the frame side walls 53 in the left-to-right direction and has a substantially U-shaped cross section. A second frame handle 58 is integrally formed on the top surface of the front side of the rear beam 55.

The side plates 52 are configured of metal plates formed through punching and pressing processes. Hereinafter, the side plate 52 on the left side will be referred to as a left side plate 52L and the side plate 52 on the right side the right side plate 52R when distinguishing between the two. The left side plate 52L and right side plate 52R are disposed parallel to each other. The side plates 52 extend in the front-to-rear direction and are substantially rectangular in a side view. The front and rear ends of the side plates 52 confront the front beam 54 and rear beam 55, respectively, in the left-to-right direction.

The side plates 52 are bent at a vertical midpoint in substantially the shape of a crank in a front view, with the top portion positioned farther outside the bottom portion in the left-to-right direction. Specifically, when projected downward, the top portions of the side plates 52 are positioned farther outside the left and right ends of the drum couplings 35 and the drum support members (not shown) of the process cartridges 13 in the respective left and right directions.

A black support hole 71 is formed in the lower portion of each side plate 52 in the region adjacent to the black mounting portion 62 and in a position corresponding to the drum support groove 56 of the respective frame side wall 53. Each black support hole 71 is substantially U-shaped in a side view with an open top. The black support hole 71 spans from the lower part of the side plate 52 to the bent portion thereof.

A black support part 72 is formed on the bottom edge of each black support hole 71. Each black support part 72 follows an arcing shape and extends outward from the black support hole 71 in the respective left and right direction. The black support part 72 is formed integrally with the respective side plate 52 and functions to support the left and right ends of the respective drum coupling 35 and drum support member (not shown) from the bottom thereof.

Three drum retaining holes 73 that are circular in a side view are formed in the lower regions of both side plates 52 in the portion adjacent to the color mounting portion 63 and at positions corresponding to the drum support grooves 56 of the frame side walls 53.

The black support hole 71 and drum retaining holes 73 in each side plate 52 are juxtaposed at substantially regular intervals in the front-to-rear direction and are formed so as to receive the drum coupling covers 38 and drum support members (not shown).

Stopper fitting holes 74 are formed in each of the side plates 52 for receiving the stoppers 33 provided on the process cartridges 13. Four of the stopper fitting holes 74 are formed in each side plate 52 at regular intervals in the front-to-rear direction. The forwardmost stopper fitting hole 74 is a cutout that extends from the lower portion of the side plate 52 to the bent portion and is rectangular in a side view. This stopper fitting hole 74 corresponds to the stopper 33 of the black process cartridge 13K. The remaining stopper fitting holes 74 corresponding to the other process cartridges 13, i.e., the non-black (color) process cartridges 13Y, 13C, and 13M, are elongated holes extending in the front-to-rear direction in a side view.

Each side plate 52 includes a protruding part 75 on the top portion thereof, protruding outward in the left or right direction, and a rail part 76 extending along the bottom edge of the side plate 52 in the front-to-rear direction.

The protruding parts 75 constitute a contacting/separating mechanism (a drum unit pivoting mechanism) together with a pivot lever 83 (described later) in the main casing 2. The drum unit pivoting mechanism pivots the process frame 12 between an initial position and a pivot position. The protruding parts 75 are formed in a columnar shape and are disposed near the upper rear edges of the side plates 52. The protruding parts 75 protrude outward from the rear end of the process unit 12 in the axial direction of the photosensitive drums 16.

The rail parts 76 are formed continuously with the bottom edges of the side plates 52, protruding inward in the left or right direction. The front end of each rail part 76 is bent so as to slope upward toward the front.

Cutout parts 77 are formed in the left side plate 52L at positions corresponding to the developer guide grooves 32 of the left side walls 31L, and cutout parts 78 are formed in the right side plate 52R at positions corresponding to the electrodes 39 provided on the right side walls 31R.

The cutout parts 77 formed in the left side plate 52L are U-shaped in a side view and are open on the top. The shape of the cutout parts 77 conforms to the peripheral surfaces of the developing rollers 20. The cutout parts 78 formed in the right side plate 52R are substantially rectangular-shaped in a side view with a front-to-rear dimension long enough to expose all electrodes 39 on the respective right side walls 31R when viewed from the side.

When mounting the process cartridges 13 in the process frame 12, first the yellow process cartridge 13Y, magenta process cartridge 13M, and cyan process cartridge 13C, i.e., the non-black process cartridges 13, are mounted in the color mounting portion 63 of the cartridge support frame 51.

The operator mounts the non-black process cartridges 13 in the color mounting portion 63 by gripping the grip part 40 of each process cartridge 13, positioning the process cartridge 13 so that the front and/or rear edges of the process cartridge 13 are flush with the partitioning plates 59 while the drum couplings 35 are aligned with the drum support grooves 56, and inserts the process cartridge 13 downward into the color mounting portion 63 so that the drum couplings 35 are fitted into the drum support grooves 56.

At this time, the process cartridge 13 is positioned in the color mounting portion 63 so that the bottom edges of both side walls 31 of the process cartridge 13 contact the cartridge support rails 65 on both frame side walls 53. After sequentially mounting each non-black process cartridge 13 in the color mounting portion 63, the left and right side plates 52 are assembled on the process frame 12.

The operator assembles the left and right side plates 52 on the process frame 12 by positioning each side plate 52 relative to the cartridge support frame 51 so that the drum couplings 35 or drum support members (not shown) on the non-black process cartridges 13 are fitted into the drum retaining holes 73 formed in the side plates 52 and so that the drum support grooves 56 formed in the cartridge support frame 51 are aligned with the drum retaining holes 73 and the black support hole 71 formed in each side plate 52.

Figure 4:
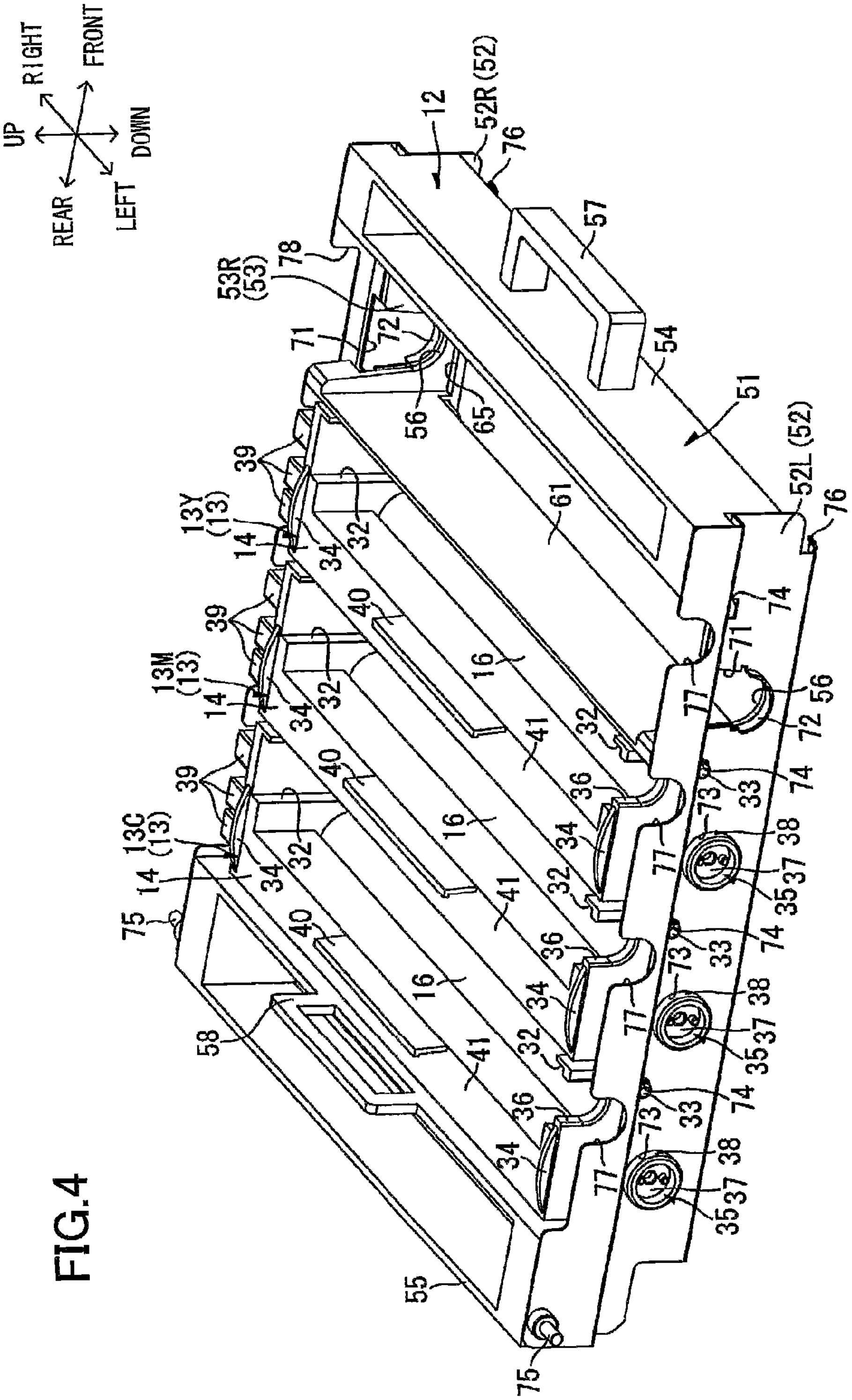
FIG. 4 is a perspective view of the drum unit when color photosensitive drums are mounted in a process frame.

Consequently, the non-black process cartridges 13 are non-detachably supported in the process frame 12, as shown in FIG. 4. Accordingly, the photosensitive drums 16 provided in the non-black process cartridges 13 are non-detachably supported between the side plates 52 and capable of rotating relative to the side plates 52. That is, the photosensitive drums 16 provided in the non-black process cartridges 13 are fixed in the process frame 12.

Further, the stoppers 33 provided on each process cartridge 13 are inserted into the corresponding stopper fitting holes 74 in a direction from the inside of the side plate 52 toward the outside. Further, the cutout parts 77 formed in the left side plate 52L are aligned with the developer couplings 43 of the process cartridges 13 in the left-to-right direction, while the cutout parts 78 formed in the right side plate 52R are aligned with the electrodes 39 on the process cartridges 13 in the left-to-right direction. Accordingly, the developer couplings 43 and electrodes 39 are exposed on the left and right sides of the left side plate 52L and right side plate 52R, respectively.

Figure 5:
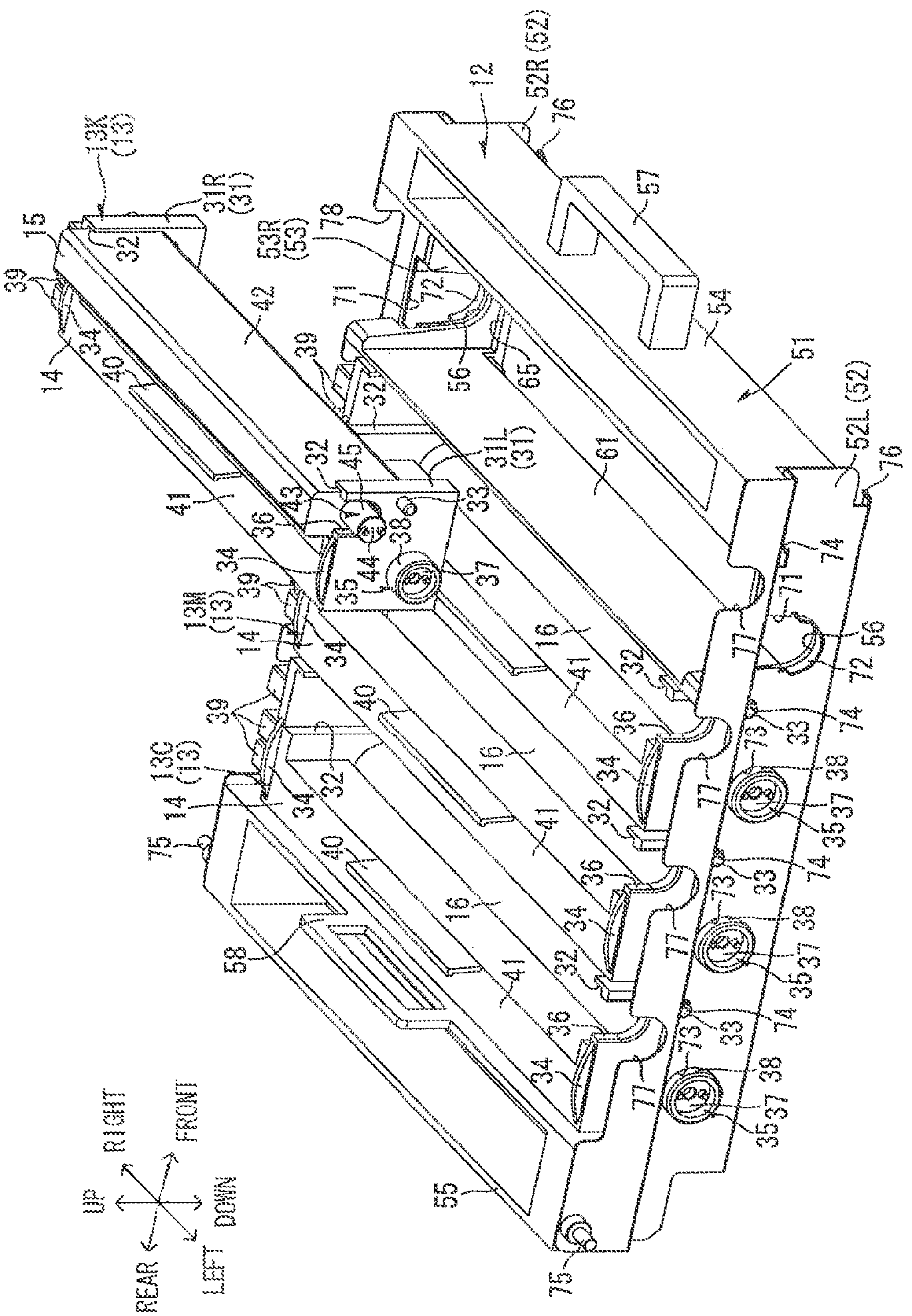
FIG. 5 is a perspective view of the drum unit when a black photosensitive drum is mounted in the process frame shown in FIG. 4.

Next, the black process cartridge 13K is mounted in the black mounting portion 62. As shown in FIG. 5, the black process cartridge 13K is mounted in the black mounting portion 62 in a manner similar to that used for mounting the non-black process cartridges 13 in the color mounting portion 63. Specifically, the operator grips the grip part 40 of the black process cartridge 13K and positions the black process cartridge 13K so that the front end of the black process cartridge 13K is aligned with the front beam 54 and the rear end is aligned with the black partitioning plate 61, and so that the drum couplings 35 are aligned with the black support holes 71 and the stoppers 33 with the stopper fitting holes 74 (see FIG. 6). Next, the operator inserts the black process cartridge 13K downward into the black mounting portion 62, fitting the drum couplings 35 into the black support holes 71 and the stoppers 33 into the stopper fitting holes 74.

Since the black support holes 71 and stopper fitting holes 74 are open on the top, the black process cartridge 13K is detachably supported in the process frame 12. Consequently, the photosensitive drum 16 provided in the black process cartridge 13K is detachably supported between the side plates 52 and is capable of rotating relative to the side plates 52. In other words, the photosensitive drum 16 of the black process cartridge 13K is detachably provided in the process frame 12. At this time, mounting of all process cartridges 13 in the process frame 12 is completed.

Figure 7:
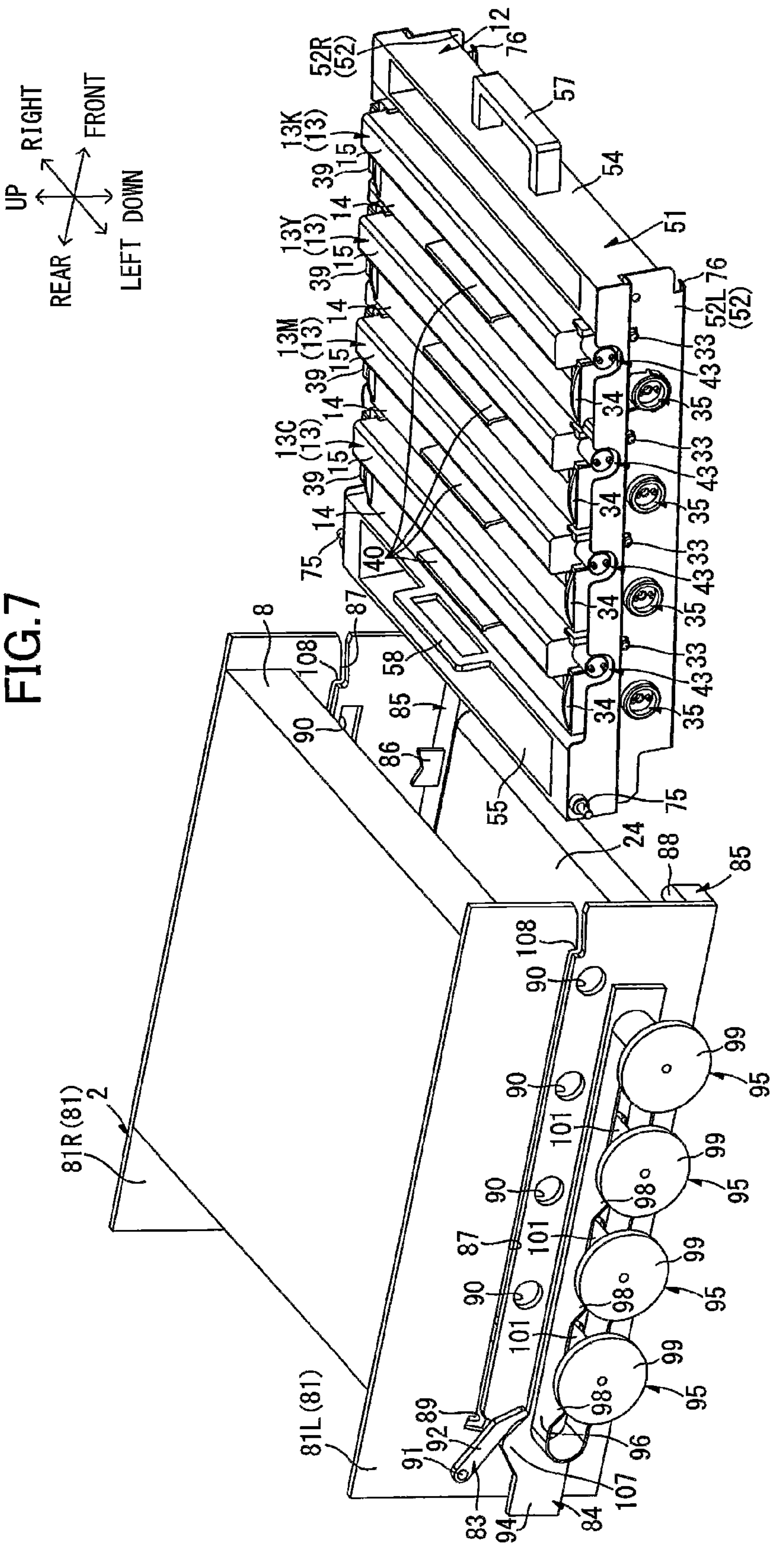
FIG. 7 is a perspective view illustrating an operation for mounting the drum unit in a main body of the image forming apparatus.
Figure 8:
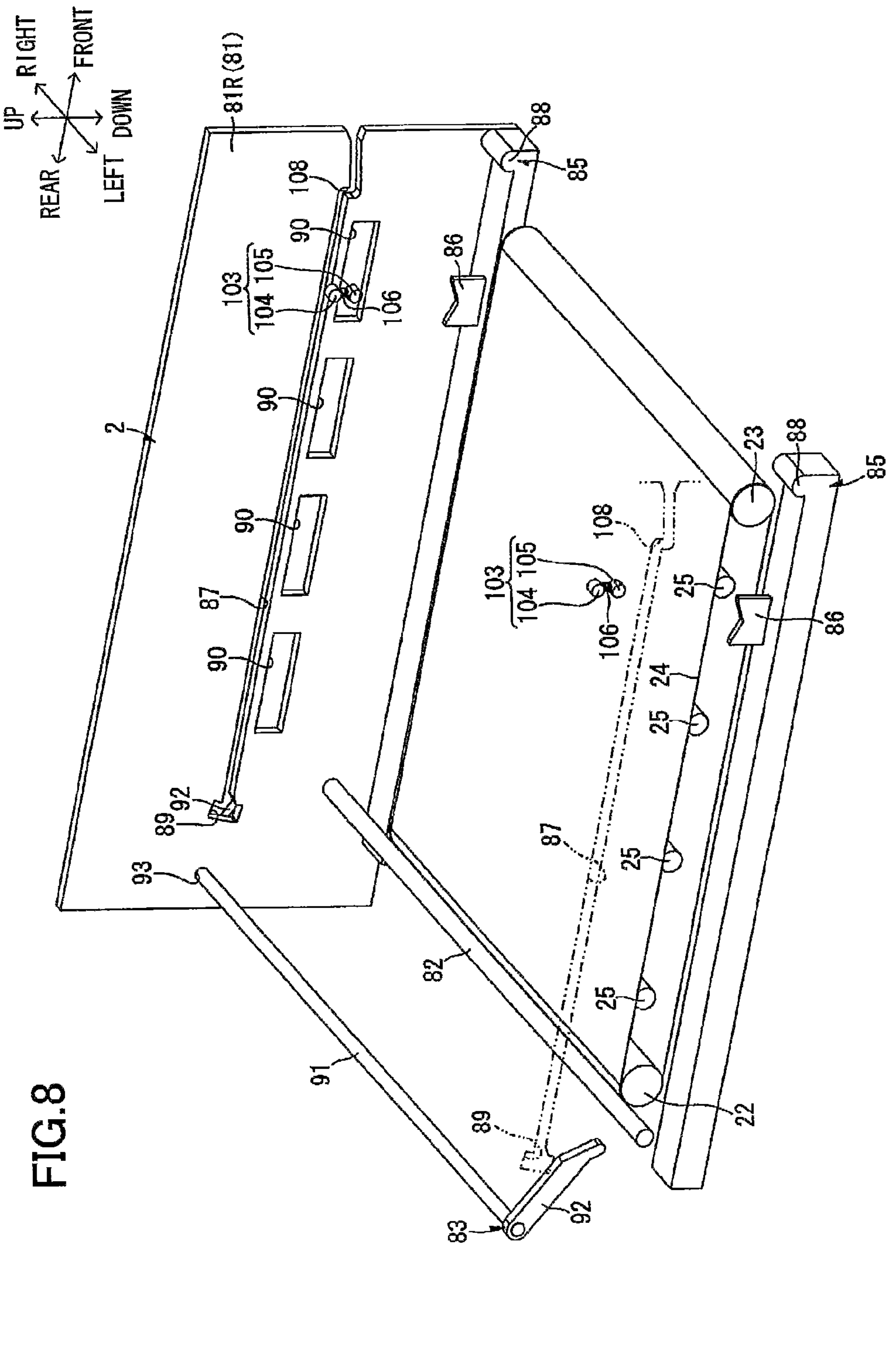
FIG. 8 is an explanatory diagram illustrating an interior of the main body shown in FIG. 7.

As shown in FIGS. 7 and 8, the main casing 2 includes a pair of left and right casing side walls 81 disposed parallel to each other on either side of the conveying belt 24, a reference shaft 82 spanning between the casing side walls 81, the pivot lever 83 spanning between the casing side walls 81, pressing members 103, and a translation cam mechanism 84 disposed on the left side of the left casing side wall 81. Hereinafter the casing side wall 81 on the left side will be referred to as the left casing side wall 81L and the casing side wall 81 on the right side the right casing side wall 81R. The reference shaft 82 adjusts a position of the drum unit in the main casing 2.

As shown in FIG. 8, each of the casing side walls 81 includes a frame support part 85, and a black positioning plate 86. A frame guide groove 87 is also formed in each casing side wall 81. The frame support parts 85 are provided along the lower edge of both casing side walls 81 in the front-to-rear direction and protrude inward from the inner surfaces of the casing side walls 81 in the respective left and right directions. A protrusion 88 is formed on the front end of each frame support part 85. The protrusion 88 has an arc shape in a side cross-sectional view and protrudes upward.

Each black positioning plate 86 is a flat plate that is substantially rectangular in a side view. The black positioning plate 86 is disposed rearward of the corresponding protrusion 88 and protrudes upward from the top surface of the corresponding frame support part 85. A portion is cut out from the top edge of each black positioning plate 86 to form a shallow V-shape in a side view so that the top edge of the black positioning plate 86 is lower in the center than the front and rear edges. The black positioning plates 86 are disposed in positions for receiving the black support parts 72 of the side plates 52 when the process frame 12 is mounted in the main casing 2 (see FIG. 6).

The frame guide grooves 87 extend in the front-to-rear direction through substantially the vertical center of the casing side walls 81 and are shaped for receiving the protruding parts 75 provided on the process frame 12. A step part 108 formed substantially in a crank-shape when viewed from the side is formed in the front end of each frame guide groove 87. A pivot guide groove 89 that is wider vertically than the frame guide groove 87 is formed in the rear end of each frame guide groove 87.

The pivot guide groove 89 has a rectangular shape in a side view. As will be described later in greater detail, the pivot guide grooves 89 function to receive the protruding parts 75 when the process frame 12 is mounted in the main casing 2 and to guide vertical movement of the protruding parts 75 when the process frame 12 is pivoted, thereby restricting the pivoting range of the process frame 12.

As shown in FIGS. 7 and 8, through-holes 90 are formed in both casing side walls 81 at positions corresponding to the developer couplings 43 or electrodes 39. The through-holes 90 formed in the left casing side wall 81L are formed in a circular shape in a side view that corresponds to the shape of the developer couplings 43, while the through-holes 90 formed in the right casing side wall 81R are rectangular-shaped in a side view and are large enough to expose all electrodes 39.

As shown in FIG. 8, the reference shaft 82 is formed of metal or the like in a rod shape and extends between the lower rear ends of the casing side walls 81. The bottom surface on the rear end of the process frame 12 contacts the reference shaft 82 when the process frame 12 is completely mounted in the main casing 2.

As shown in FIG. 7, the pivot lever 83 constitutes a contacting/separating mechanism together with the protruding parts 75 of the process frame 12. The pivot lever 83 is pivotable in a plane perpendicular to the axial directions of photosensitive drums 16. The pivot lever 83 includes a pivot shaft 91, and a pair of lever members 92 coupled one with each end of the pivot shaft 91 so as to be incapable of rotating relative to the pivot shaft 91.

As shown in FIG. 8, the pivot shaft 91 has a rod shape and is disposed in substantially the vertical center of the casing side walls 81 toward the rear ends thereof. Both ends of the pivot shaft 91 are rotatably inserted through through-holes 93 penetrating the casing side walls 81 and protrude outward from the casing side walls 81 in the left and right directions.

The lever members 92 are formed in arm-like shapes. The rear ends of the lever members 92 are coupled with the pivot shaft 91 at a point outside the casing side walls 81 relative to the left and right directions. Through this construction, the front ends of the lever members 92 pivot vertically, i.e., in a direction orthogonal to the left-to-right direction, about the pivot shaft 91.

As shown in FIG. 8, the pressing member 103 is disposed on the inner side of each casing side wall 81. Each pressing member 103 includes a rib 104 supported on the main casing 2, a pressing protrusion 105 capable of sliding vertically, and a compression spring 106 disposed between the rib 104 and pressing protrusion 105.

The rib 104 is disposed above and slightly forward of the black positioning plate 86 and is fixed in position relative to the main casing 2 by a support frame (not shown). The pressing protrusion 105 is disposed directly below the rib 104 while separated therefrom. The pressing protrusion 105 is positioned to contact and apply pressure to the tops of the protrusions 34 formed on the process cartridge 13 when the process frame 12 is mounted in the main casing 2.

As shown in FIG. 7, the translation cam mechanism 84 is disposed on the outer surface of the left casing side wall 81L. The translation cam mechanism 84 selectively transmits drive power to each of photosensitive drums 16. The translation cam mechanism 84 includes a translation cam 94 serving as a switching member, and four drive transmission gear parts 95 for transmitting a drive force to each of the photosensitive drums 16.

The translation cam 94 is formed from a flat plate having a substantially rectangular shape in a side view. While the function of the translation cam 94 will be described later in greater detail, the translation cam 94 is capable of moving in the front-to-rear direction.

A protruding part 107 is formed on the top edge of the translation cam 94 near the rear end thereof. The protruding part 107 is substantially triangular in a side view and protrudes upward from the top edge of the translation cam 94. In other words, the protruding part 107 protrudes toward the pivot lever 83. The top of the protruding part 107 is formed level. The protruding part 107 is disposed so as to push the left lever member 92 of the pivot lever 83 upward when the top end of the protruding part 107 contacts this lever member 92.

Figure 12:
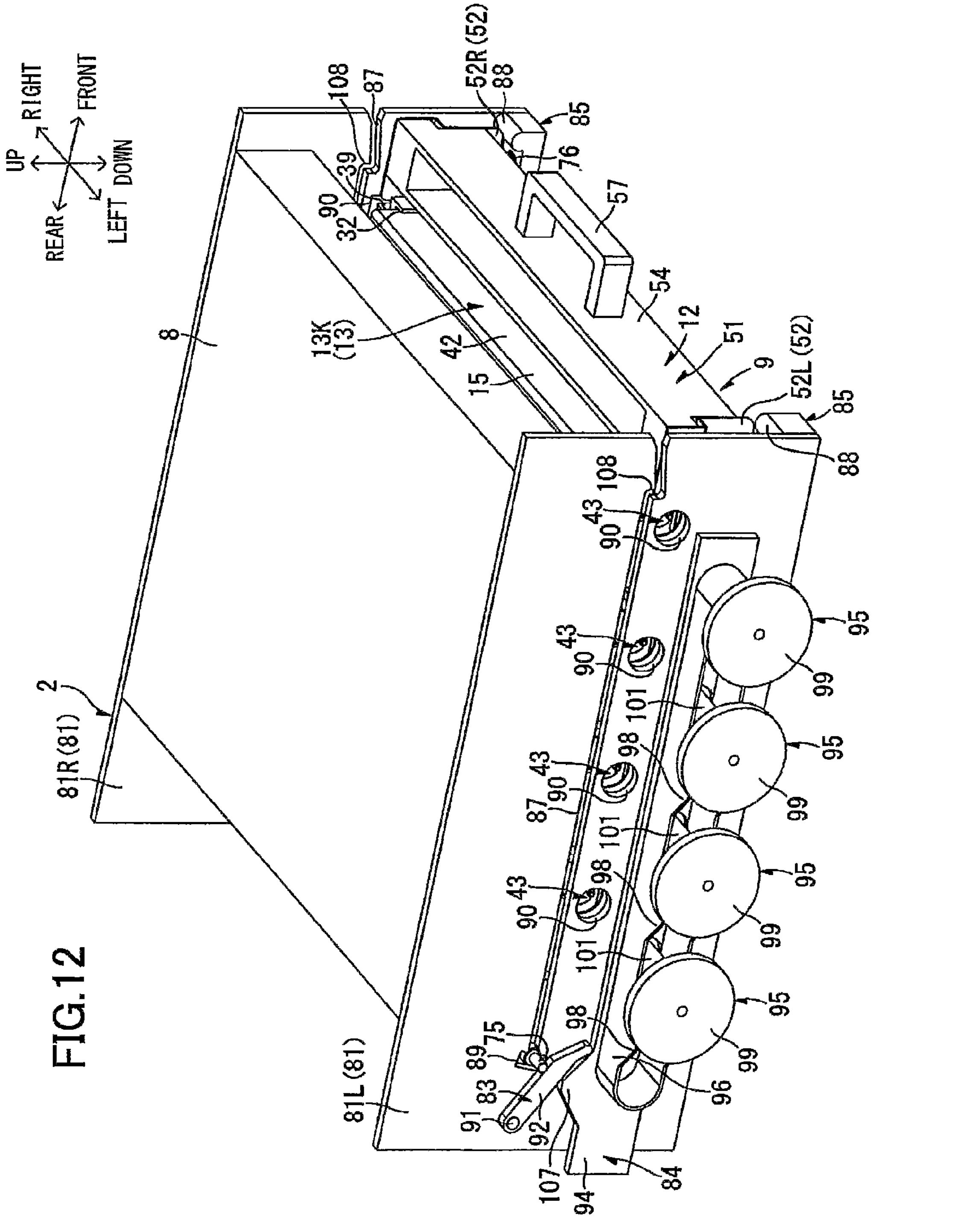
FIG. 12 is a perspective view illustrating the operation for mounting the drum unit from the state shown in FIG. 10, where the drum unit has been completely mounted in the main body.

As shown in FIG. 12, an elongated hole is formed in the translation cam 94. The hole is elongated in the front-to-rear direction and has a front-to-rear length nearly equivalent to the front-to-rear length of the process frame 12. A cylindrical part 96 is integrally formed with the translation cam 94 around the elongated hole, protruding leftward from the peripheral edge of the elongated hole.

Figure 13:
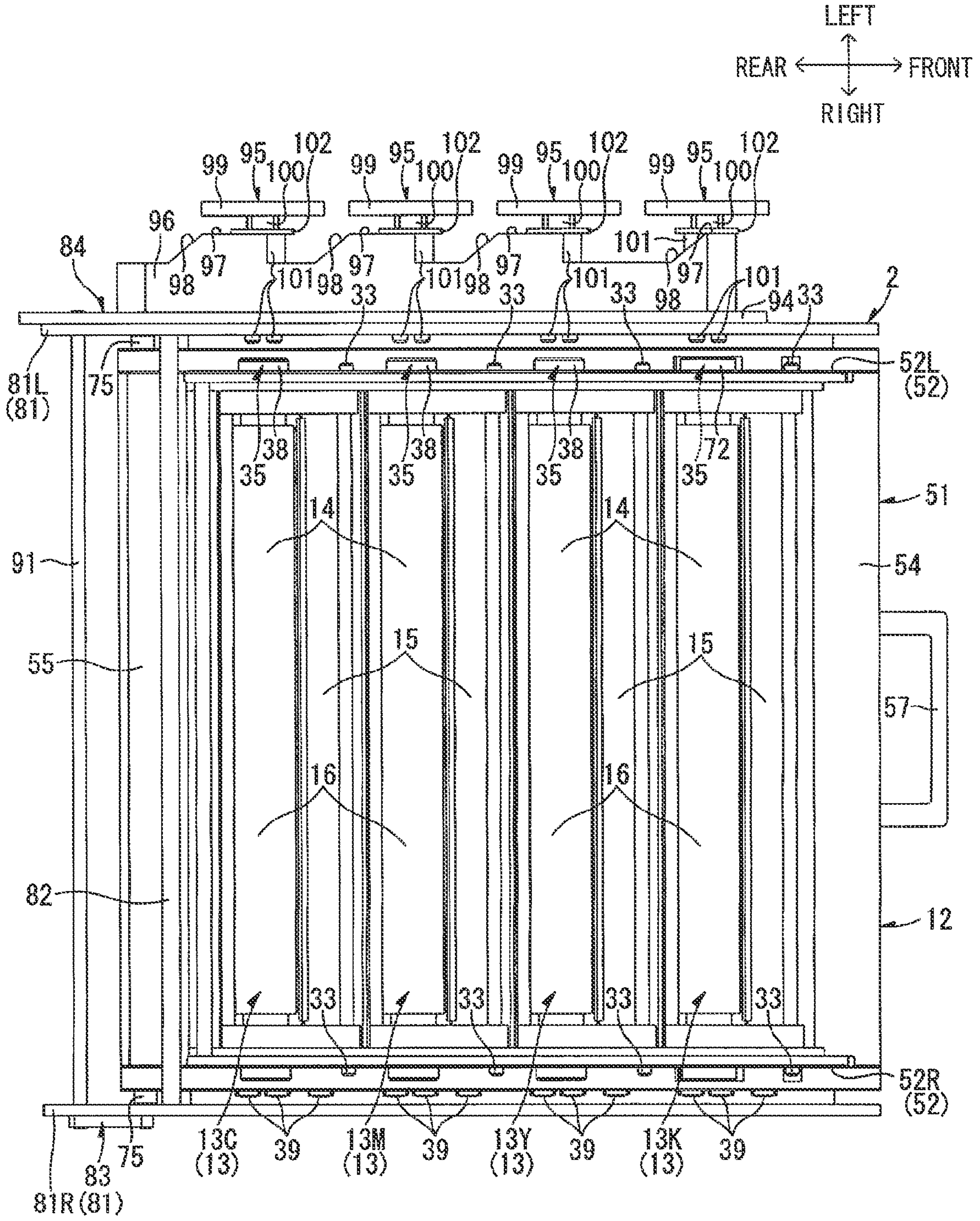
FIG. 13 is a base view illustrating the image forming apparatus in the state shown in FIG. 12.

As shown in FIG. 13, the cylindrical part 96 is integrally formed with four retracting parts 97 corresponding to the four drive transmission gear parts 95 that protrude leftward from the left edge of the cylindrical part 96, and sloped parts 98 formed continuously with the rear edges of the retracting parts 97. The front-to-rear dimension of the forwardmost retracting part 97 (i.e., the retracting part 97 corresponding to the black process cartridge 13K) is shorter than the same dimension of the other three retracting parts 97. The protruding length of each of the sloped parts 98 grows gradually shorter in the direction rearward from the rear edge of the corresponding retracting parts 97.

Each drive transmission gear part 95 includes a gear 99, a shaft 100, and a male drum coupling member 101. A drive force generated by a motor (not shown) provided in the main casing 2 is inputted into the gears 99. The shaft 100 is integrally formed with the corresponding gear 99 and extends rightward from the same.

The right end of the male drum coupling member 101 is formed to mate with the female drum coupling member 37 of drum coupling 35, while the left end is formed in a cylindrical shape for receiving the shaft 100 so that the shaft 100 cannot rotate relative to the male drum coupling member 101. A bridge part 102 having a diameter longer than the vertical length of the cylindrical part 96 is formed on the left end of the male drum coupling member 101.

A compression spring (not shown) is also mounted between the gear 99 and the bridge part 102 for urging the male drum coupling member 101 rightward.

Next, an operation for mounting the process frame 12 in the main casing 2 will be described with referred to FIGS. 9-12. When mounting the process frame 12 in the main casing 2, the operator first grips the first frame handle 57 and second frame handle 58 on the process frame 12 and inserts the protruding parts 75 on the process frame 12 into the front ends of the frame guide grooves 87 formed in the main casing 2. While gripping the first frame handle 57, the operator pushes the process frame 12 rearward.

Figure 9:
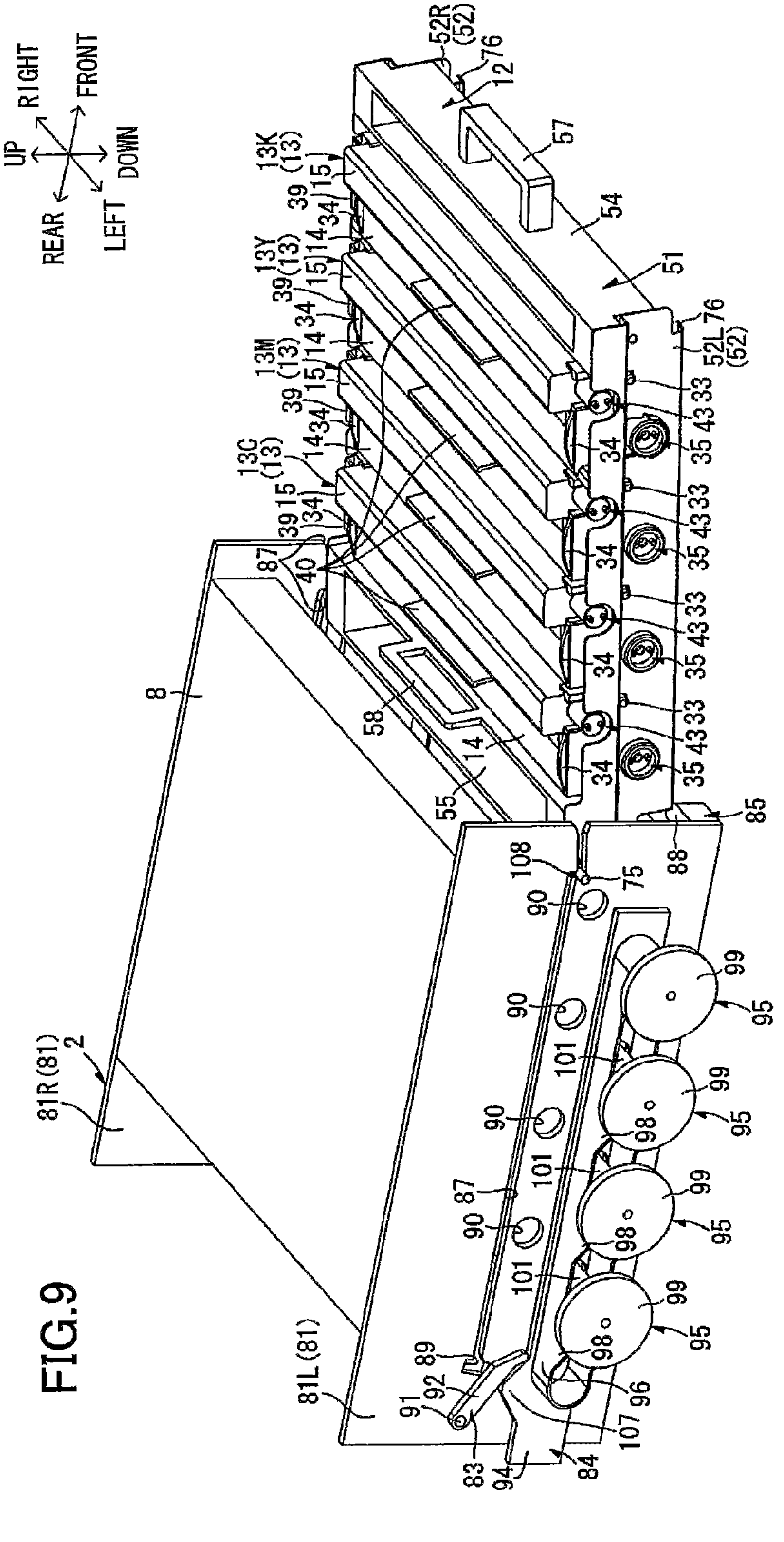
FIG. 9 is a perspective view illustrating an operation for mounting the drum unit in the main body.

At this point, the protruding parts 75 are guided along the frame guide grooves 87 and contact the step parts 108 formed in the frame guide grooves 87, as shown in FIG. 9. In this state, the process frame 12 is oriented along a slant, with the rear end positioned lower than the front end, and the rail parts 76 along the lower edges of the process frame 12 are positioned outside the main casing 2.

Figure 10:
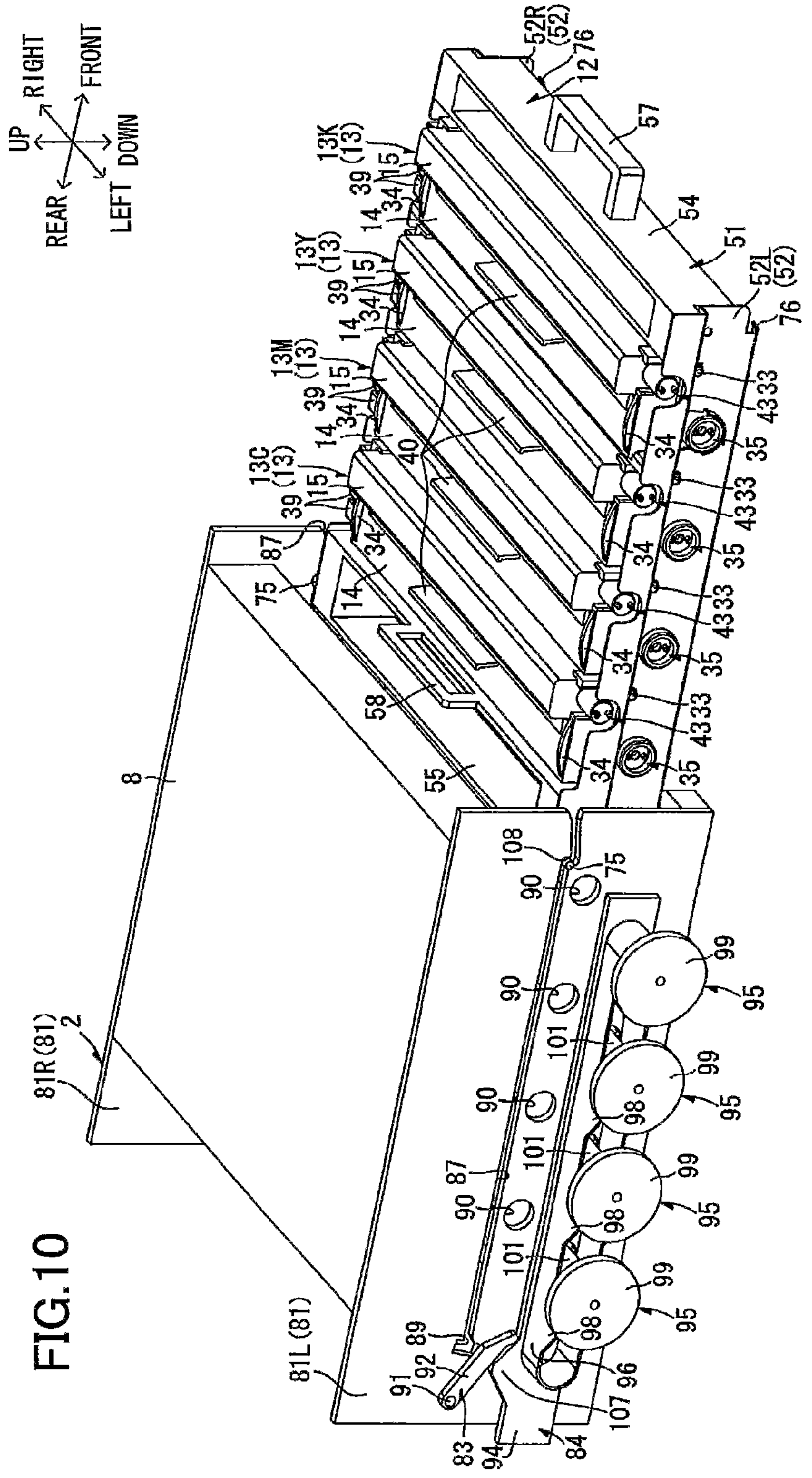
FIG. 10 is an explanatory diagram illustrating an operation for mounting the drum unit in the main body.

Next, while continuing to grip the first frame handle 57, the operator grips the second frame handle 58 and lifts the second frame handle 58 upward. As a consequence, the protruding parts 75 move upward in the step parts 108 of the frame guide grooves 87, as shown in FIG. 10. When the process frame 12 is brought to a level state, the bottom edge of the process frame 12 on the rear end thereof is inserted into the main casing 2.

Figure 11:
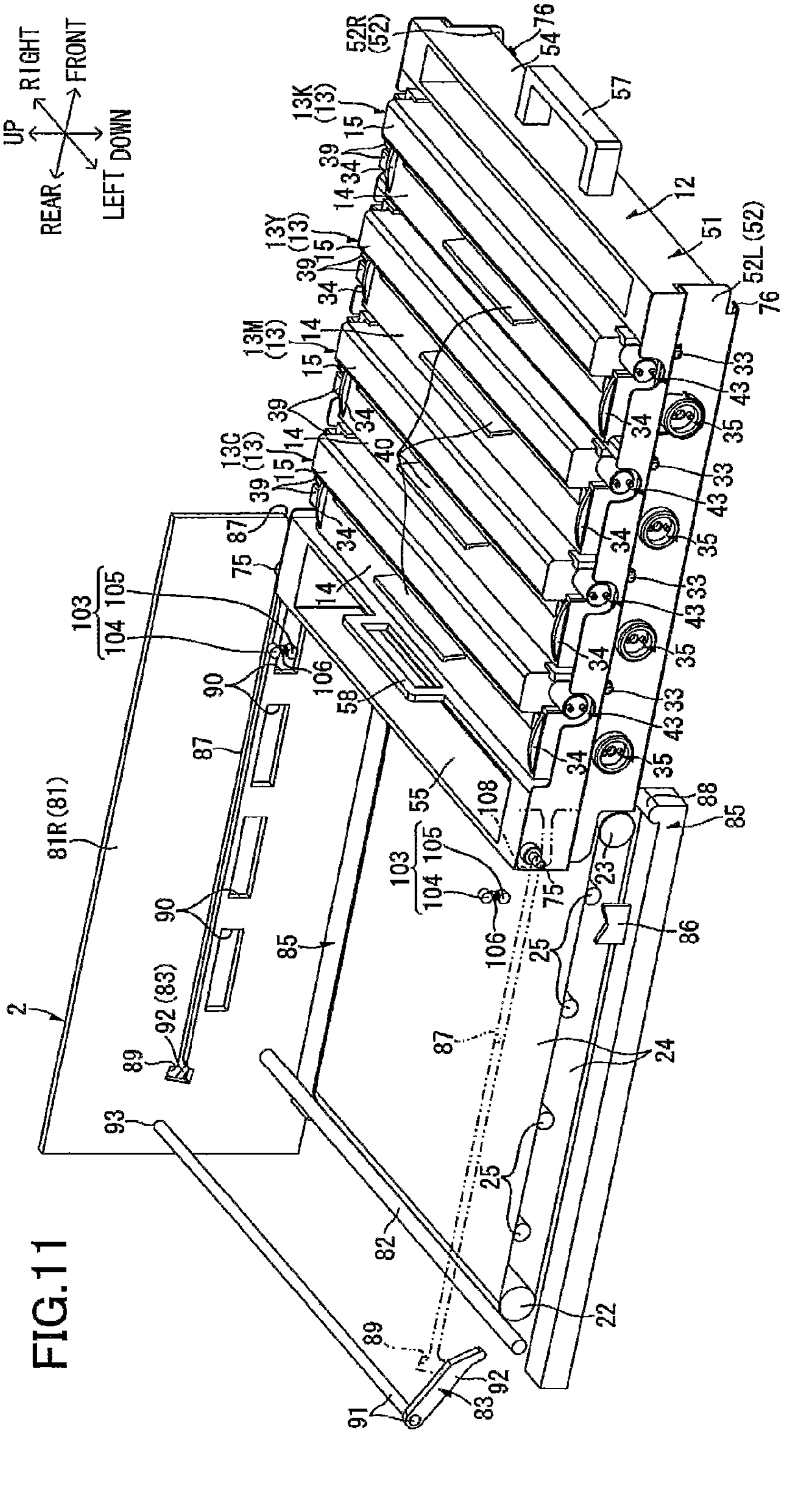
FIG. 11 is an explanatory diagram illustrating the interior of the main body in a state shown in FIG. 10.

At this time, the rail parts 76 on the process frame 12 are in contact with the protrusions 88 of the main casing 2 so that the protrusions 88 support the rear ends of the process frame 12 on the bottom thereof, as shown in FIG. 11.

Next, the operator continues to push the process frame 12 rearward, while the protruding parts 75 are guided rearward along the frame guide grooves 87. When the protruding parts 75 arrive in the pivot guide grooves 89 formed at the rear ends of the frame guide grooves 87, the operation for mounting the process frame 12 is complete, as shown in FIG. 12.

Next, an operation of process unit 9 will be described with referred to FIGS. 12-21. The printer 1 includes a control unit (not shown) that sets the printer 1 to one among the monochrome mode, the color mode, and the drum detachable mounting mode. Details of each mode will be described below.

When the process frame 12 is completely mounted in the main casing 2 as shown in FIG. 12, the protruding parts 75 are positioned on the lower edges of the pivot guide grooves 89 and protrude outward from the casing side walls 81 in the respective left and right directions. Also at this time, the translation cam 94 is in a first position, which is a drum detachable mounting position, and the protruding part 107 is positioned on the rear side of the left lever member 92. When the process frame 12 is completely mounted in the main casing 2, the control unit (not shown) sets the printer 1 to the drum detachable mounting mode.

Further, the drum couplings 35 are in confrontation with the cylindrical part 96 of the translation cam 94 in the left-to-right direction so that the drum couplings 35 are exposed through the cylindrical part 96 on the left side of the main casing 2.

Similarly, the developer couplings 43 are in confrontation with the through-holes 90 formed in the left casing side wall 81L in the left-to-right direction, whereby the developer couplings 43 are exposed through the through-holes 90 on the left side of the main casing 2. By inserting male coupling members (not shown) into the through-holes 90 to be coupled with the female developer coupling members 44, a drive force can be transmitted to the developer couplings 43.

Similarly, the electrodes 39 are in confrontation with the through-holes 90 formed in the right casing side wall 81R in the left-to-right direction, whereby the electrodes 39 are exposed through the through-holes 90 on the right side of the main casing 2.

Further, as shown in FIG. 13, the bridge parts 102 of all the male drum coupling members 101 are in contact with the corresponding retracting parts 97 of the translation cam 94, so that all male drum coupling members 101 are retracted leftward. In other words, the translation cam 94 has uncoupled the female drum coupling members 37 (FIG. 14) of all photosensitive drums 16 from all male drum coupling members 101.

Figure 14:
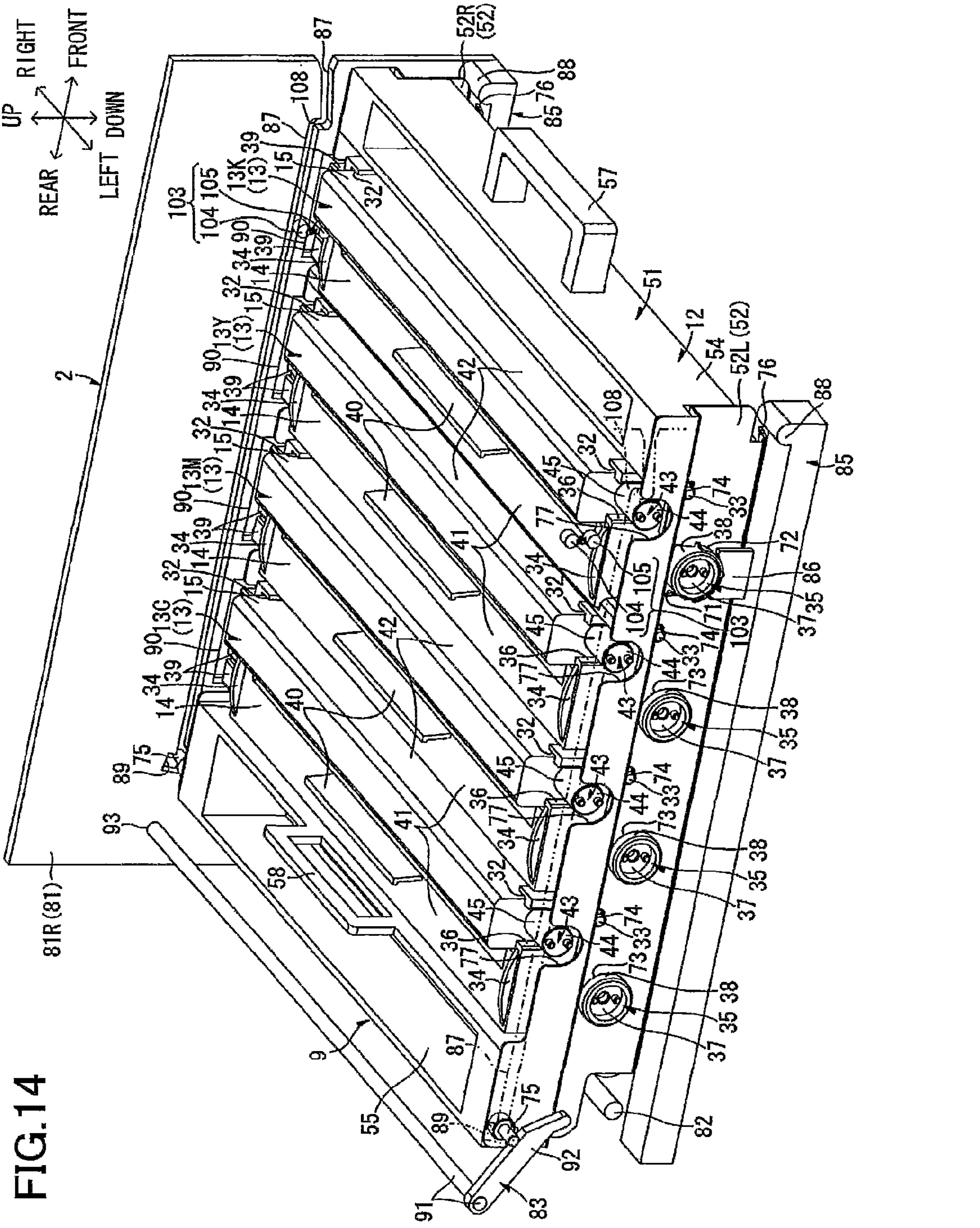
FIG. 14 is an explanatory diagram illustrating the interior of the main body shown in FIG. 12.

Further, the rail parts 76 are no longer in contact with the protrusions 88, as shown in FIG. 14. Consequently, the black support parts 72 are in contact with and supported by the black positioning plates 86. The rear end of the process frame 12 also contacts the reference shaft 82 and is supported thereon. With this configuration, the process frame 12 is disposed in a level orientation in the main casing 2.

Figure 15A:
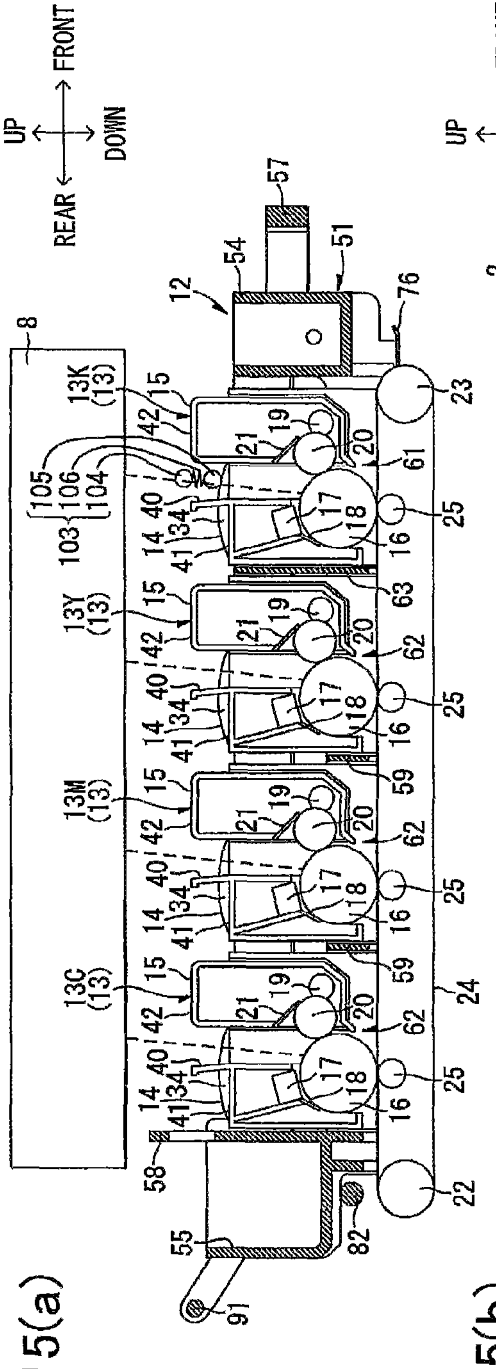
FIG. 15(*a*) is a perspective view illustrating the drum unit and the main body in the state shown in FIG. 12.
Figure 15B:
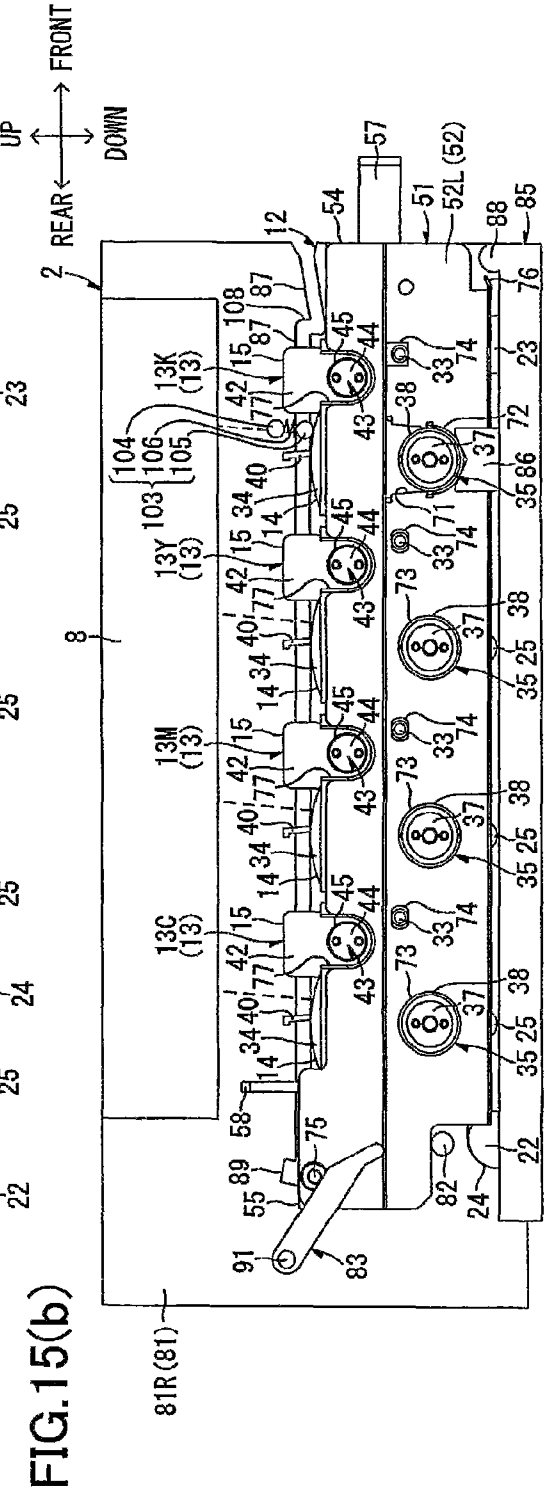

As shown in FIG. 15(*a*), all of the photosensitive drums 16 are in contact with the conveying belt 24. As shown in FIG. 15(*b*), the pressing protrusions 105 of the pressing members 103 are in contact with the tops of the protrusions 34, applying a downward pressure to the protrusions 34. More specifically, the pressing members 103 press both side walls 31 and the drum partition 41 of the black process cartridge 13K downward toward a position between the corresponding photosensitive drum 16 and stopper 33.

Further, the rail parts 76 are disposed in confrontation with but are separated from the frame support parts 85 vertically. Consequently, the printer 1 is in the drum detachable mounting mode in which the photosensitive drums 16 can be detached from the main casing 2.

Figure 16:
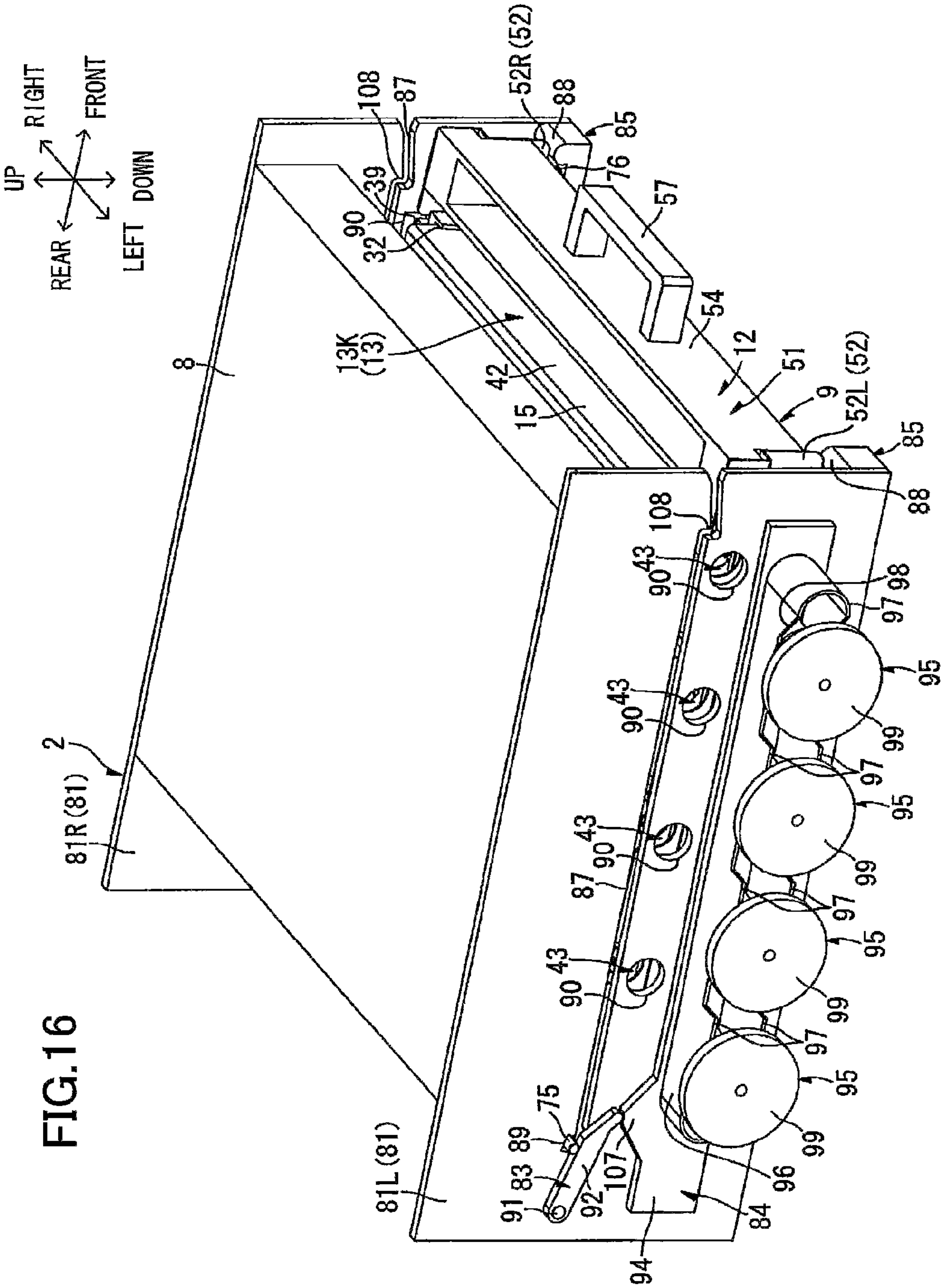
FIG. 16 is a perspective view illustrating the image forming apparatus when the image forming apparatus is set to a monochrome mode.

When the control unit (not shown) sets the printer 1 to the monochrome mode, the translation cam 94 is subsequently moved forward as shown in FIG. 16, and then the protruding part 107 contacts the left lever member 92 and the lever member 92 pivots upward along the front sloped surface of the protruding part 107. The right lever member 92 consequently pivots upward together with the left lever member 92. As the lever members 92 pivot, the upper edges of the lever members 92 contact the bottoms of the protruding parts 75 and lift the protruding parts 75 upward. In other words, the lever member 92 pivots from the initial position shown in FIG. 12 to the pivot position shown in FIG. 16.

Figure 17:
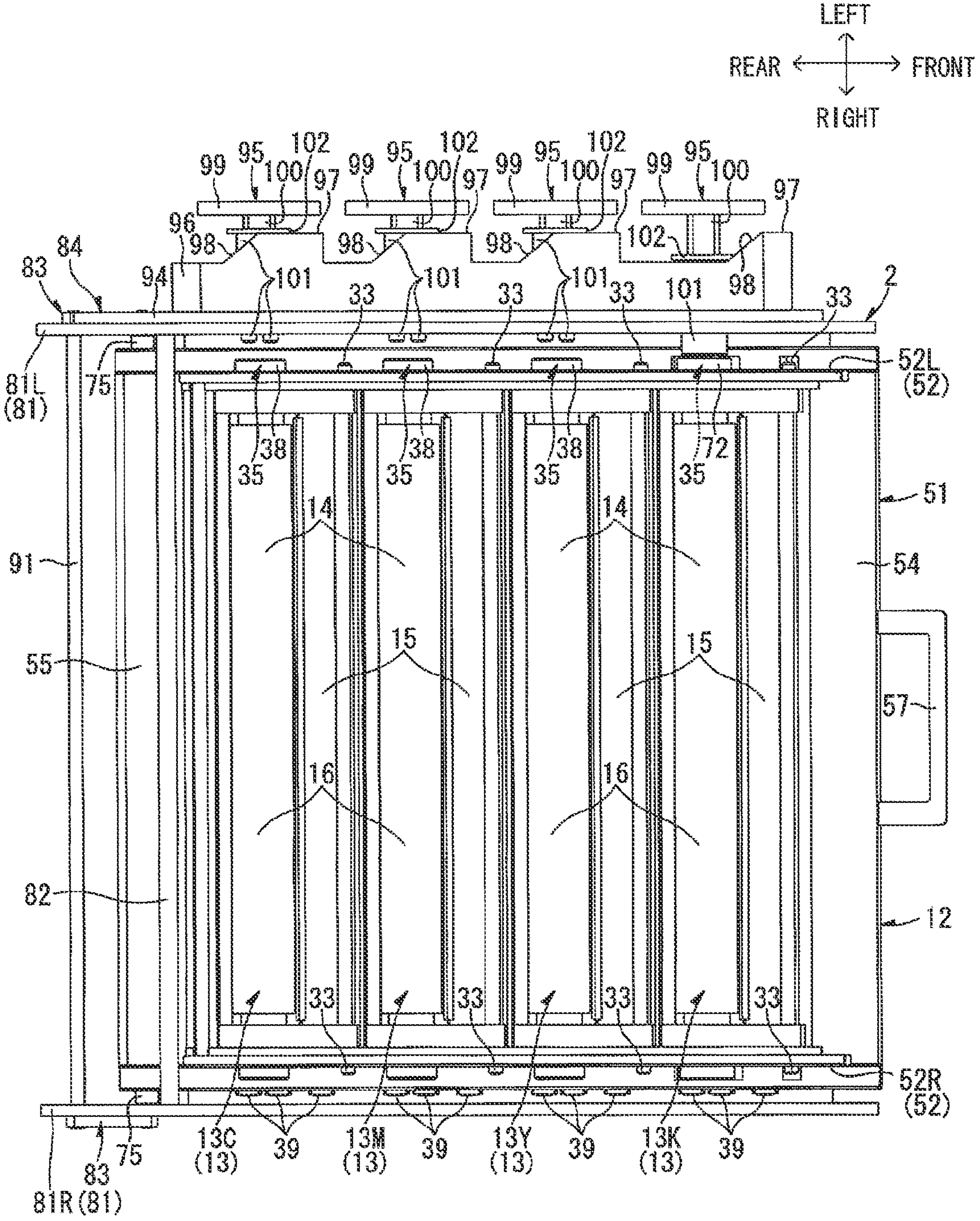
FIG. 17 is a base view illustrating the image forming apparatus when the image forming apparatus is set to the monochrome mode.

At the same time, the bridge part 102 of the male drum coupling member 101 corresponding to the black process cartridge 13K is released from its contact with the retracting part 97 of the cylindrical part 96 and advances rightward along the sloped part 98, as shown in FIG. 17.

When the translation cam 94 reaches a second position, which is a monochrome image-forming position, the front end of the lever member 92 is in contact with the top of the protruding part 107, as shown in FIG. 16. At this point, the lever members 92 have lifted the protruding parts 75 to the top ends of the pivot guide grooves 89.

Figure 18:
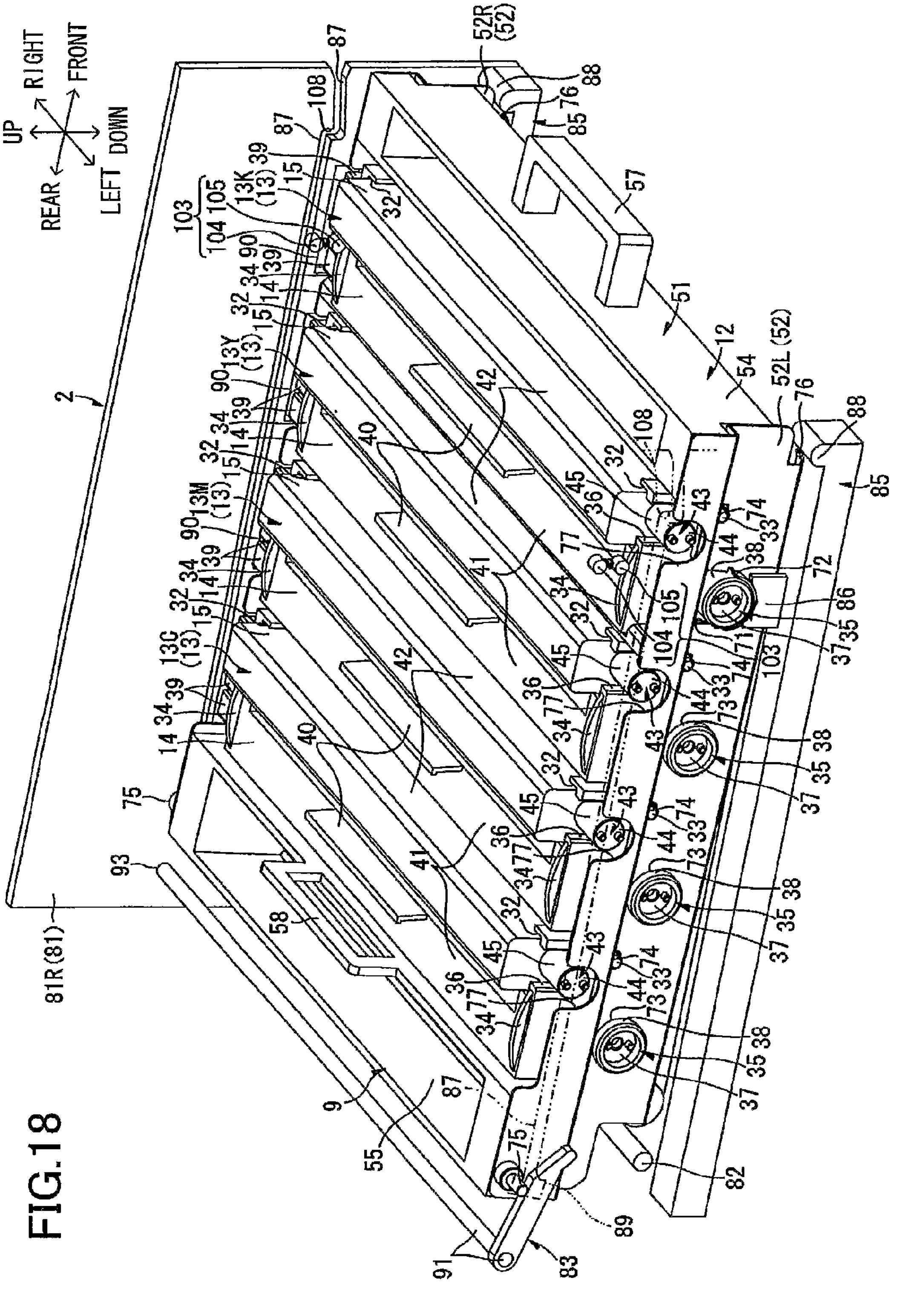
FIG. 18 is an explanatory diagram illustrating the interior of the main body when the image forming apparatus is set to the monochrome mode.
Figure 19A:
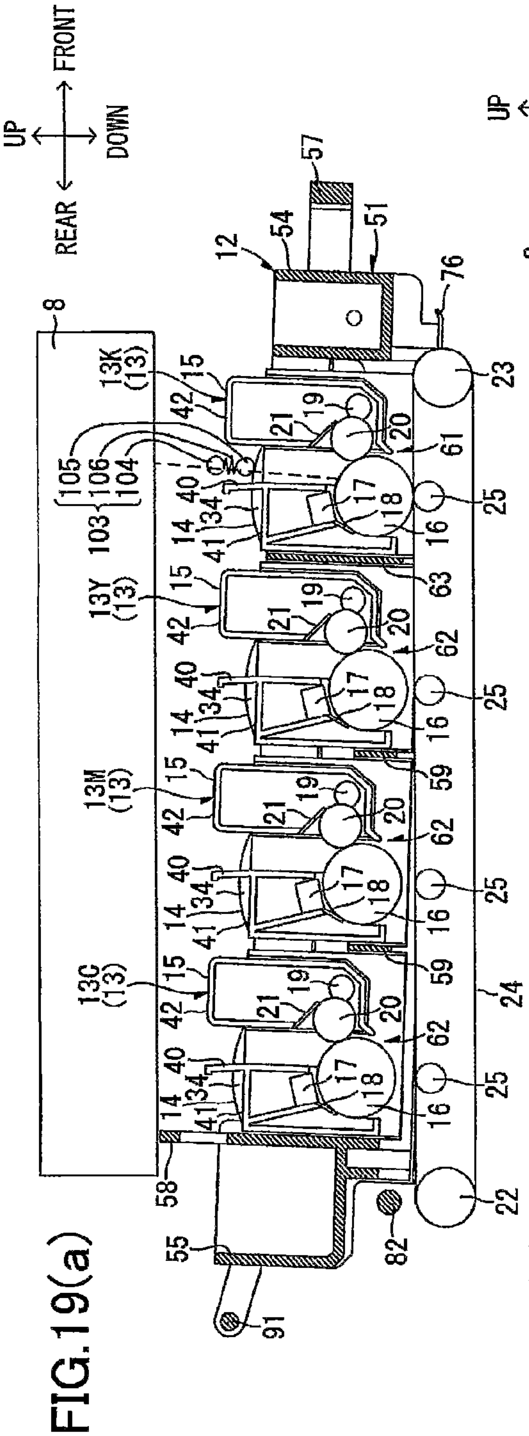
FIG. 19(*a*) is a perspective view illustrating the drum unit and the main body when the image forming apparatus is set to the monochrome mode.
Figure 19B:
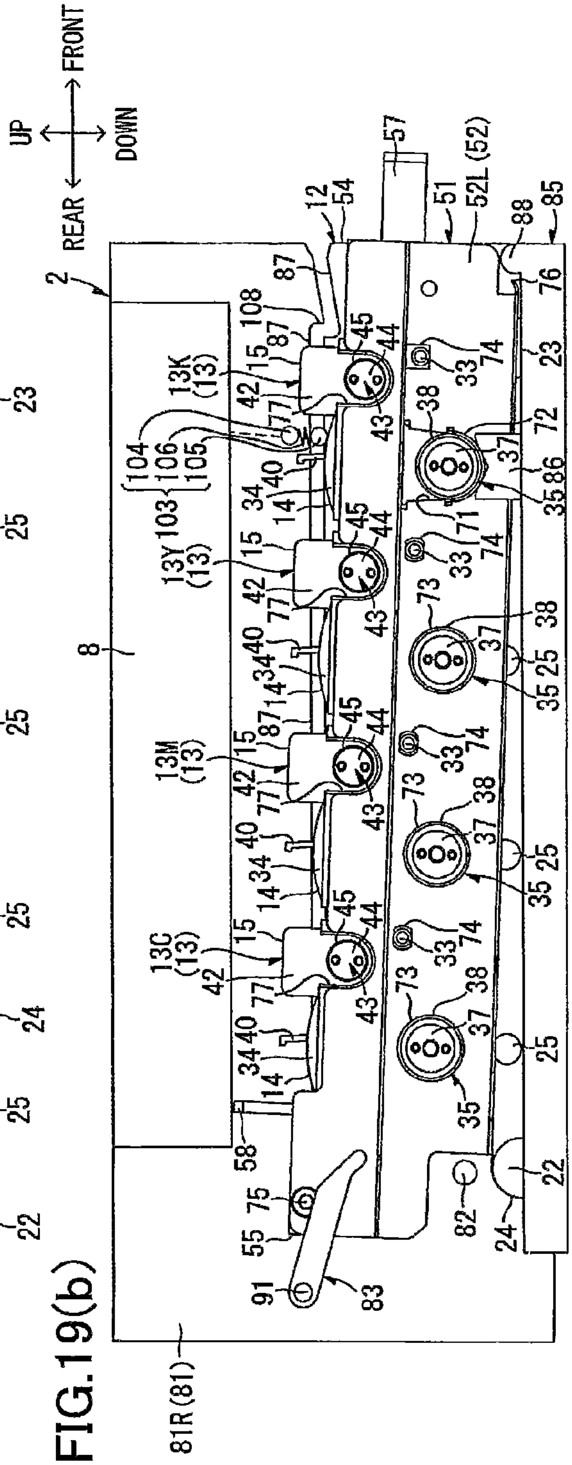

Through this operation, the process frame 12 is pivoted about the central axis of the photosensitive drum 16 in the black process cartridge 13K, with the rear end of the process frame 12 rising upward, as illustrated in FIGS. 18 and 19(*b*).

Further, the photosensitive drum 16 of the black process cartridge 13K is in contact with the conveying belt 24, while the photosensitive drums 16 of the non-black process cartridges 13 confront the conveying belt 24 vertically but are separated therefrom, as shown in FIG. 19(*a*).

At the same time, the male drum coupling member 101 corresponding to the black process cartridge 13K is coupled with the female drum coupling member 37 of the black process cartridge 13K so as to share the same central axis, as shown in FIG. 17. The male drum coupling members 101 corresponding to the non-black process cartridges 13 are still retracted leftward and are therefore not coupled with the corresponding female drum coupling members 37.

In this state, the printer 1 is in the monochrome mode for forming monochromatic images. When a drive force is inputted into each of the gears 99 in this monochrome mode, the drive force is transmitted to the black photosensitive drum 16, but not to the non-black photosensitive drums 16, enabling the formation of images in black only. At this time, the male drum coupling members 101 corresponding to the non-black photosensitive drums 16 rotate while remaining disengaged from the photosensitive drums 16.

Figure 20:
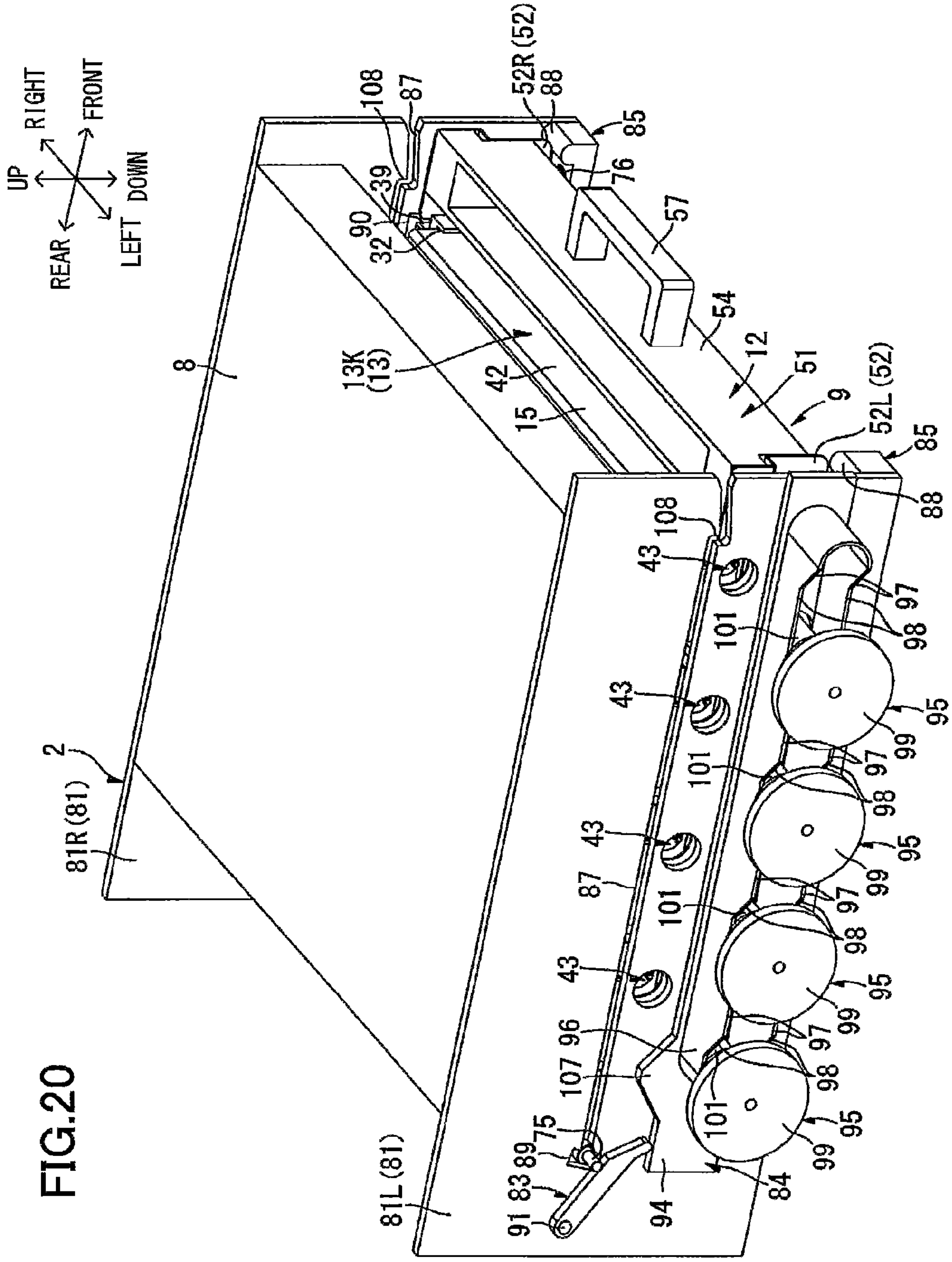
FIG. 20 is a perspective view illustrating the image forming apparatus when the image forming apparatus is set to a color mode.

When the control unit (not shown) sets the printer 1 to the color mode, the translation cam 94 is moved farther forward as shown in FIG. 20, and then the lever member 92 pivots downward along the sloped rear surface of the protruding part 107, and consequently both lever members 92 pivot downward. As the lever members 92 pivot downward, the protruding parts 75 also drop downward.

Figure 21:
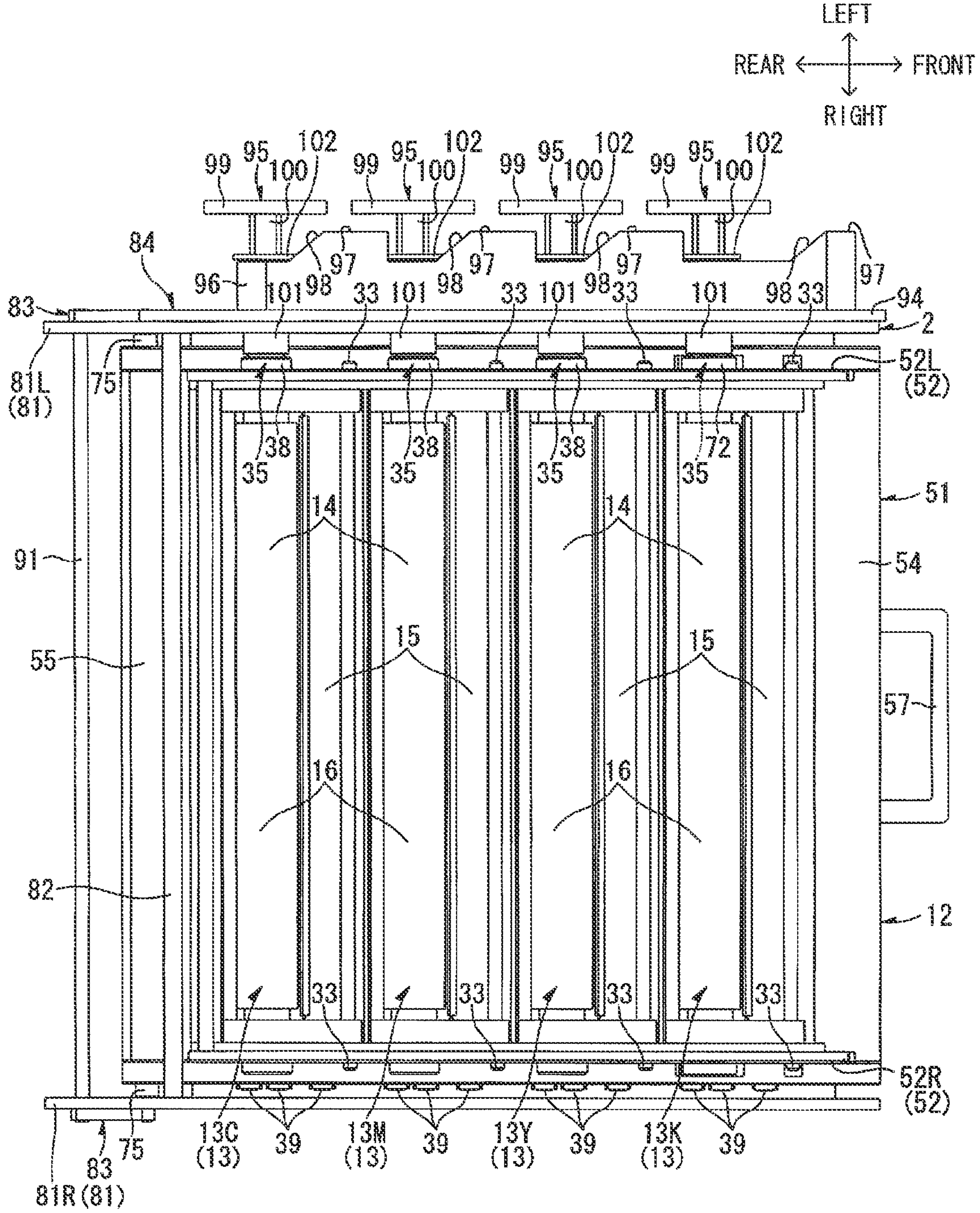
FIG. 21 is a base view illustrating the image forming apparatus when the image forming apparatus is set to the color mode.

At the same time, as shown in FIG. 21, the bridge parts 102 of all male drum coupling members 101 are disengaged from the retracting parts 97 of the cylindrical part 96 and advance rightward along the sloped parts 98.

Figure 22:
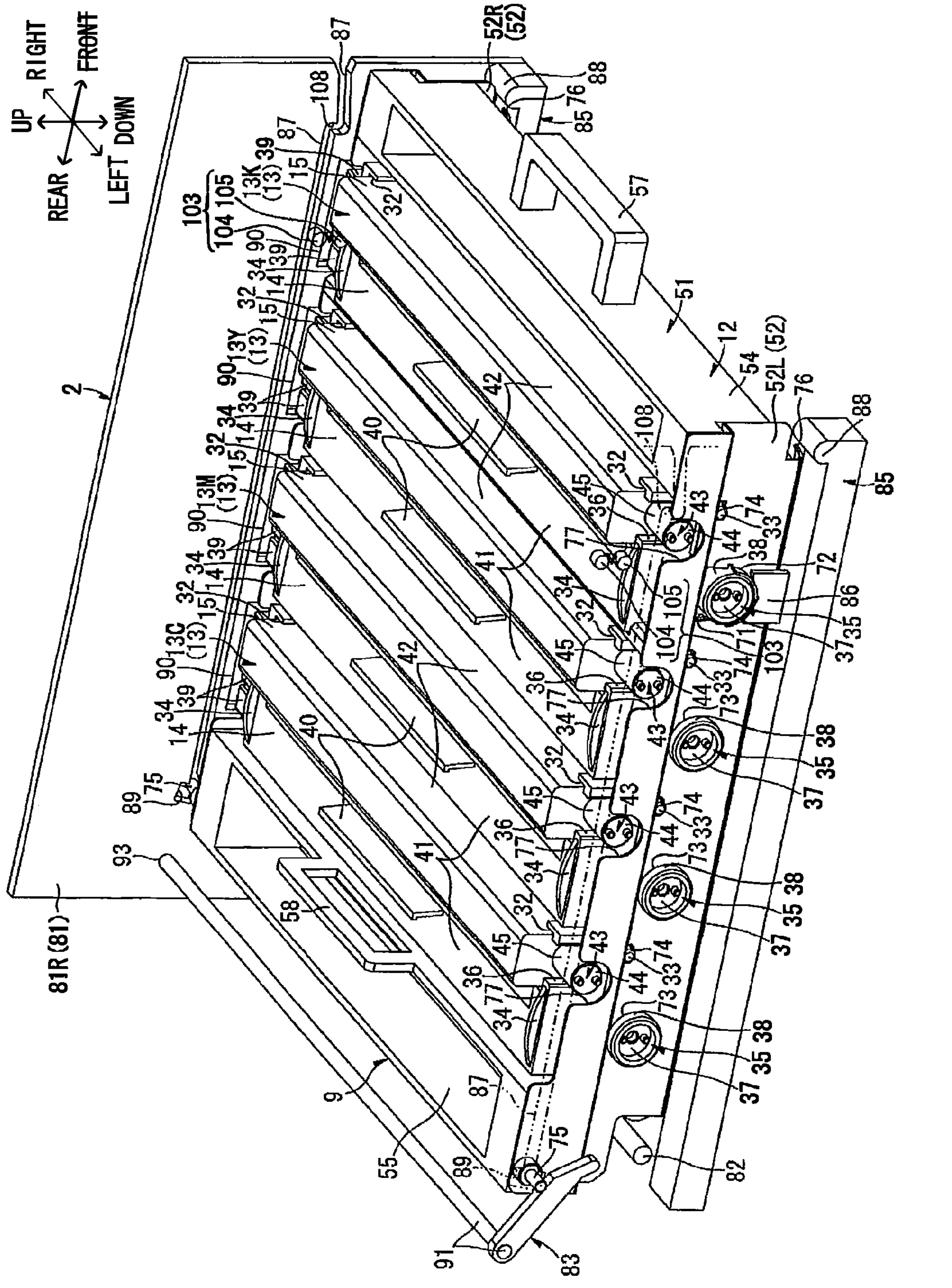
FIG. 22 is an explanatory diagram illustrating the interior of the main body when the image forming apparatus is set to the color mode.

When the translation cam 94 reaches a third position, which is the color image-forming position, the front end of the left lever member 92 no longer contacts the protruding part 107, as shown in FIG. 20. At this time, the protruding parts 75 are once again disposed in the bottom part of the pivot guide grooves 89. Accordingly, as shown in FIG. 22, the rear end of the process frame 12 again contacts the reference shaft 82 so that the process frame 12 is in a level orientation. In addition, as in the drum detachable mode, all of the photosensitive drums 16 are in contact with the conveying belt 24.

Further, all of the male drum coupling members 101 are coupled with the corresponding female drum coupling members 37 and share the central axis of the female drum coupling members 37, as shown in FIG. 21. Thus, the printer 1 is in a color mode for forming color images. When a drive force is inputted into the gears 99 in the color mode, the drive force is transmitted to all photosensitive drums 16 in order to form a color image.

As shown in FIG. 5, the color laser printer 1 is provided with four photosensitive drums 16. The photosensitive drums 16 provided in the non-black process cartridges 13 are fixed to the process frame 12, while the photosensitive drum 16 provided in the black process cartridge 13K is detachably provided in the process frame 12.

Accordingly, the black photosensitive drum 16 can be removed and replaced while the non-black photosensitive drums 16 remain fixed to the process frame 12. As a result, when the non-black photosensitive drums 16 are used with low frequency while the black photosensitive drum 16 is used with high frequency, this construction allows the user to efficiently maintain the frequently used black photosensitive drum 16 while preserving the relative positioning of the infrequently used non-black photosensitive drums 16. Hence, the printer 1 allows efficient maintenance of the photosensitive drums 16 based on usage frequency while ensuring high-quality image formation.

In the printer 1, as shown in FIG. 5, the non-black photosensitive drums 16 are non-detachably supported between the side plates 52 of the process frame 12. Accordingly, the pitch between neighboring non-black photosensitive drums 16 can be preserved with greater precision.

Further, in the printer 1, as shown in FIG. 5, the black photosensitive drum 16 is detachably supported between the side plates 52 of the process frame 12. Accordingly, the black photosensitive drum 16 can be removed from the process frame 12 while preserving the pitch between neighboring photosensitive drums 16 with precision.

In the printer 1, the black photosensitive drum 16 is disposed in the front side of the process frame 12, as shown in FIG. 1. Hence, when the user is mounting and removing the process frame 12 on the front side, the black photosensitive drum 16 is positioned nearest the user. This construction makes it easy to remove the black photosensitive drum 16 from the process frame 12, facilitating replacement operations.

As illustrated in FIG. 19, the black photosensitive drum 16 is provided in the front end of the process frame 12 according to the printer 1, and the non-black photosensitive drums 16 can be separated from the conveying belt 24 by pivoting the rear end of the process frame 12 upward about the axis of the black photosensitive drum 16.

With this configuration, all non-black photosensitive drums 16 provided in the process frame 12 can be separated from the conveying belt 24 as a unit, while preserving the relative positioning of all photosensitive drums 16. In other words, the non-black photosensitive drums 16 can be separated from the conveying belt 24 while maintaining the pitch between neighboring photosensitive drums 16. Therefore, this construction ensures high-quality image formation while suitably reducing wear on the photosensitive drums 16.

In the printer 1 according to the preferred embodiment, the process frame 12 can slide in the front-to-rear direction. In this way, the four photosensitive drums 16 can be operated as a unit.

With the printer 1, the pivot lever 83 and protruding parts 75 (contacting/separating mechanism) for pivoting the process frame 12 are disposed on the rear side of the process frame 12, as shown in FIG. 14. Hence, this construction makes it easy to apply the contacting/separating mechanism to the rear end of the process frame 12. Consequently, the process frame 12 can easily be pivoted.

More specifically, as illustrated in FIGS. 19(*a*) and 19(*b*), the printer 1 has the pivot lever 83 that can pivot in a direction orthogonal to the left-to-right direction, and protruding parts 75 protruding outward from the rear end of the process frame 12 in the left and right directions. The process frame 12 can be pivoted when the pivot lever 83 contacts and moves the protruding part 75. Hence, the process frame 12 can be pivoted through a simple contacting/separating mechanism.

Further, when all photosensitive drums 16 are in contact with the conveying belt 24, as illustrated in FIGS. 15 (*a*) and 15(*b*), the rear end of the process frame 12 is in contact with the reference shaft 82, thereby positioning the process frame 12 relative to the conveying belt 24. Accordingly, the photosensitive drums 16 can be positioned relative to the conveying belt 24 in order to reliably maintain suitable contact between the photosensitive drums 16 and the conveying belt 24.

Figure 6:
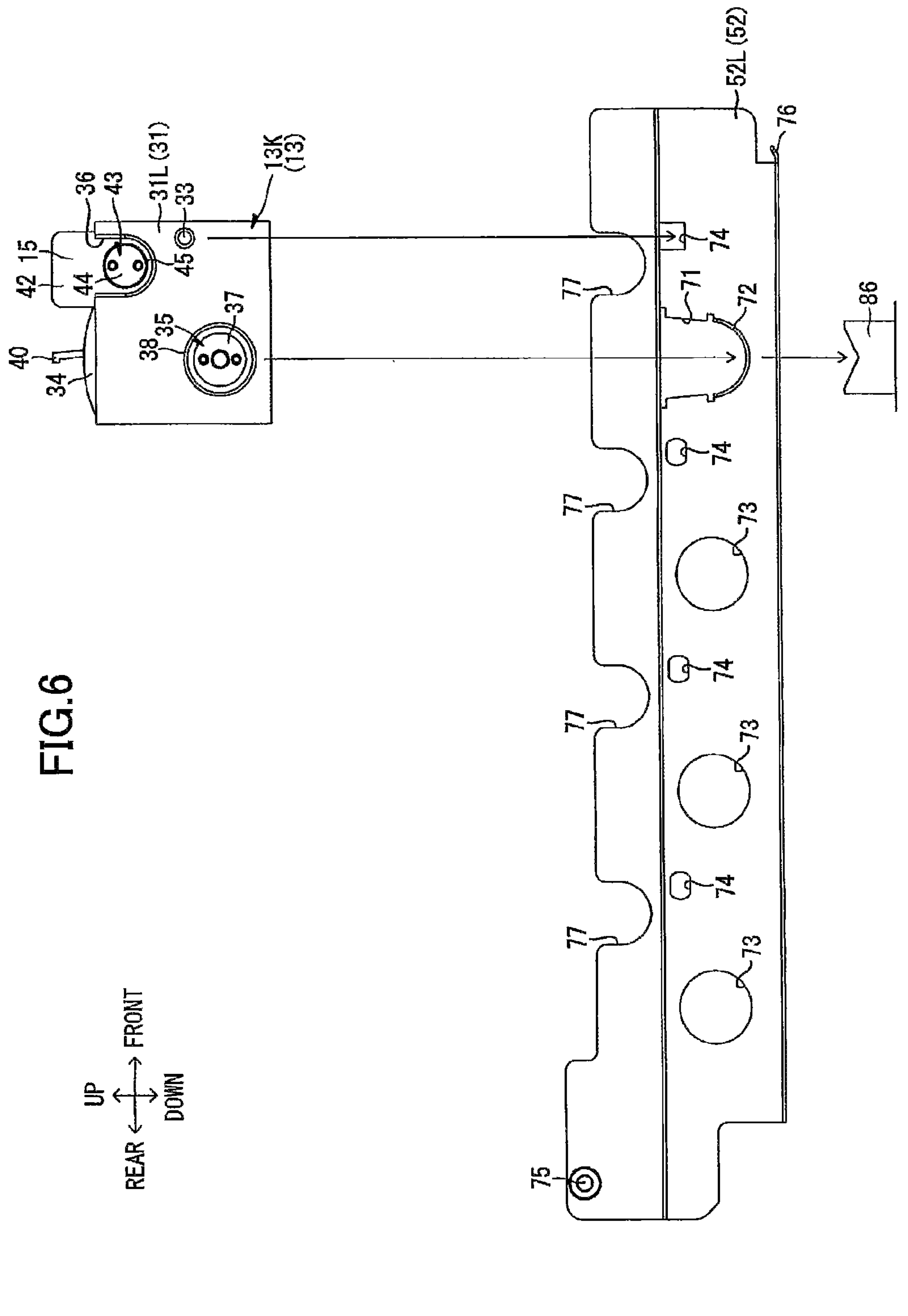
FIG. 6 is an explanatory diagram showing how to position the black photosensitive drum.

Further, the pressing members 103 press downward on the arc-shaped protrusions 34 formed on the side walls 31 of the black process cartridge 13K, as shown in FIG. 15. Further, the protrusions 34 share a central axis with the photosensitive drums 16, as shown in FIG. 6. Accordingly, when pressed against the protrusions 34, the pressing members 103 constantly apply a force to the black photosensitive drum 16 toward the central axis thereof. This force is constantly applied toward the black photosensitive drum 16, even when the position of contact between the pressing members 103 and protrusions 34 changes as the process frame 12 is pivoted.

More specifically, as shown in FIG. 15, the pressing members 103 press the side walls 31 toward a position between the black photosensitive drum 16 and the corresponding stoppers 33 separated from the black photosensitive drum 16. Accordingly, the pressing members 103 can apply pressure to both the photosensitive drum 16 and the stoppers 33. Consequently, the black photosensitive drum 16 is always fixed in position, even when the process frame 12 is pivoted.

Further, in the printer 1, each of the male drum coupling members 101 is coaxially coupled with a corresponding photosensitive drum 16 when in the color mode. By sharing the same axis as the corresponding photosensitive drums 16, the male drum coupling members 101 can input a drive force to the photosensitive drums 16. As a result, a drive force can be precisely transmitted from the male drum coupling members 101 to the photosensitive drums 16.

The male drum coupling members 101 are uncoupled from the non-black photosensitive drums 16 in the monochrome mode when the non-black photosensitive drums 16 are separated from the conveying belt 24. Hence, when the male drum coupling members 101 are uncoupled from the non-black photosensitive drums 16, the rotation of the non-black photosensitive drums 16 is halted when the photosensitive drums 16 are separated from the conveying belt 24, even though the male drum coupling members 101 continue to rotate. Accordingly, the translation cam mechanism 84 can be provided in a simple structure for coupling or uncoupling the male drum coupling members 101 from the photosensitive drums 16.

The printer 1 also has a drum detachable mounting mode in which the photosensitive drums 16 is allowed to be mounted on or separated from the main casing 2. Accordingly, the process frame 12 having the photosensitive drums 16 can be removed in the drum detachable mounting mode, which is different from the modes for forming images (the color mode and monochrome mode). As a result, the process frame 12 can be removed while image-forming operations are not being performed.

With the printer 1, the translation cam 94 provided in the translation cam mechanism 84 is selectively movable to one of the first position corresponding to the drum detachable mounting mode, the second position corresponding to the monochrome mode, and the third position corresponding to the color mode. Hence, the modes of the printer 1 can be switched through a simple operation of sliding the translation cam 94.

By placing the translation cam 94 in the first position, all male drum coupling members 101 can be uncoupled from all photosensitive drums 16, while all photosensitive drums 16 are placed in contact with the conveying belt 24. Through this operation, the process frame 12 can be removed while the rotation of all photosensitive drums 16 is halted.

By placing the translation cam 94 in the second position, the male drum coupling member 101 corresponding to the black photosensitive drum 16 is coupled to this photosensitive drum 16, while the other male drum coupling members 101 are uncoupled from the non-black photosensitive drums 16, and the black photosensitive drum 16 is placed in contact with the conveying belt 24 while the non-black photosensitive drums 16 are separated from the conveying belt 24. Accordingly, the black photosensitive drum 16 in contact with the conveying belt 24 can be used for image formation, while the rotation of the non-black photosensitive drums 16 separated from the conveying belt 24 is halted.

By placing the translation cam 94 in the third position, all male drum coupling members 101 are coupled with all corresponding photosensitive drums 16, and all of the photosensitive drums 16 are placed in contact with the conveying belt 24. In this mode, all photosensitive drums 16 can be used for image formation.

In other words, movement of the translation cam 94 among the first, second, and third positions associates operations of the translation cam 94 for coupling or uncoupling the male drum coupling members 101 from corresponding photosensitive drums 16 with the operations of the contacting/separating mechanism (the pivot lever 83 and protruding parts 75) for placing the photosensitive drums 16 in contact with or separating the photosensitive drums 16 from the conveying belt 24. Hence, through a simple construction, the translation cam 94 can associate operations of the translation cam mechanism 84 with operations of the contacting/separating mechanism.

Further, when the translation cam 94 is placed in the first position, the top of the protruding part 107 is out of contact in the pivot lever 83 and, hence, the pivot lever 83 is not pivoted upward. Consequently, the photosensitive drums 16 are not separated from the conveying belt 24.

When the translation cam 94 is placed in the second position, the top of the protruding part 107 is contacting the pivot lever 83, which contact applies a force to the pivot lever 83 that pivots the pivot lever 83 upward. At this time, the non-black photosensitive drums 16 are separated from the conveying belt 24.

When the translation cam 94 is placed in the third position, the top of the protruding part 107 no longer contacts the pivot lever 83, as in the first position. Hence, the pivot lever 83 is not pivoted upward and the photosensitive drums 16 are not separated from the conveying belt 24.

In other words, switching the translation cam 94 between the first, second, and third positions determines whether the top of the protruding part 107 in the translation cam 94 is contacting or not contacting the pivot lever 83. The pivot lever 83 is pivoted upward when the top of the protruding part 107 contacts the pivot lever 83. The non-black photosensitive drums 16 are separated from the conveying belt 24 only when the pivot lever 83 is pivoted upward. As a result, the position of the translation cam 94 determines whether the non-black photosensitive drums 16 are in contact with or separated from the conveying belt 24.

What is claimed is:

1. An image forming apparatus comprising:

a main body;

a process frame movable into and out of the main body, the process frame including:

a first wall; and a second wall spaced apart from the first wall in a first direction, the first wall having a first surface and the second wall having a second surface, the first surface of the first wall facing the second surface of the second wall in the first direction;

a first cartridge detachably mountable to the process frame, the first cartridge including:

a photosensitive drum;

a first developing roller rotatable about a first axis extending in the first direction;

a first developer frame accommodating toner therein;

a first side wall positioned at one end of the first developer frame in the first direction;

a second side wall positioned at another end of the first developer frame in the first direction; and a first electrode positioned at the first side wall, the first electrode being configured to supply power to the first cartridge, wherein in a state where the first cartridge is mounted to the process frame:

the first side wall of the first cartridge faces the first surface of the first wall of the process frame in the first direction and the second side wall of the first cartridge faces the second surface of the second wall of the process frame in the first direction; and at least a part of the first electrode is positioned farther from the first side wall of the first cartridge than the first surface of the first wall of the process frame is from the first side wall of the first cartridge in the first direction.

2. The image forming apparatus according to claim 1, wherein the first wall extends in a second direction perpendicular to the first direction, and wherein the second wall extends in the second direction.

3. The image forming apparatus according to claim 2, wherein a top edge of the first wall in a third direction perpendicular to both of the first direction and the second direction is lower than a lowest point of the first electrode in the third direction in the state where the first cartridge is mounted to the process frame.

4. The image forming apparatus according to claim 3, wherein the first cartridge includes a plurality of the first electrodes, and wherein the top edge of the first wall in the third direction is lower than each of lowest points of the plurality of the first electrodes in the third direction in the state where the first cartridge is mounted to the process frame.

5. The image forming apparatus according to claim 2, wherein the process frame further includes a third wall extending in the first direction, the third wall connecting the first wall and the second wall, and wherein the process frame further includes a handle positioned at the third wall.

6. The image forming apparatus according to claim 1, wherein the first cartridge further includes a developing coupling positioned at the second side wall, the developing coupling being configured to input a drive force from the main body to the first developing roller.

7. The image forming apparatus according to claim 1, wherein the first cartridge further includes a drum coupling positioned at the second side wall, the drum coupling being configured to input a drive force from the main body to the photosensitive drum.

8. The image forming apparatus according to claim 1, further comprising a second cartridge including:

a second developing roller rotatable about a second axis extending in the first direction;

a second developer frame accommodating toner therein;

a second electrode positioned at one end of the second developer frame in the first direction, the second electrode being configured to supply power to the second cartridge, wherein in a state where the second cartridge is mounted to the process frame:

the second developer frame is positioned between the first wall and the second wall in the first direction;

the second electrode is positioned closer to the first wall than to the second wall; and at least a part of the second electrode is positioned farther from the second developer frame than the first surface of the first wall of the process frame is from the second developer frame in the first direction.

9. The image forming apparatus according to claim 8, further comprising a third cartridge including:

a third developing roller rotatable about a third axis extending in the first direction; and a third electrode configured to supply power to the third cartridge, wherein the process frame further includes a first partitioning plate extending in the first direction, and wherein the first partitioning plate is positioned between the first wall and the second wall in the first direction, the first partitioning plate is positioned between the second cartridge and the third cartridge in a second direction perpendicular to the first direction.

10. The image forming apparatus according to claim 9, wherein a top edge of the first partitioning plate in a third direction perpendicular to both of the first direction and the second direction is lower than a lowest point of the first electrode in the third direction in the state where the first cartridge is mounted in the process frame.

11. The image forming apparatus according to claim 8, wherein the first developer frame accommodates black toner, and wherein the second developer frame accommodates at least one of yellow toner, magenta toner, and cyan toner.

12. The image forming apparatus according to claim 1, wherein the process frame further includes another photosensitive drum such that the another photosensitive drum is movable with the first wall and the second wall in a case where the process frame moves into and out of the main body, the another photosensitive drum being non-detachably supported by the first wall and the second wall.

* * * * *